US012217758B2

(12) United States Patent
Brayman et al.

(10) Patent No.: US 12,217,758 B2
(45) Date of Patent: *Feb. 4, 2025

(54) AUTOMATED SYSTEMS AND METHODS THAT GENERATE AFFECT-ANNOTATED TIMELINES

(71) Applicant: Affective Software, Inc., Seattle, WA (US)

(72) Inventors: Vladimir Brayman, Mercer Island, WA (US); John Gottman, Deer Harbor, WA (US); Connor Eaton, Seattle, WA (US); Yuriy Gulak, Highland Park, NJ (US); Rafael Lisitsa, Seattle, WA (US)

(73) Assignee: Affective Software, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/420,383

(22) Filed: Jan. 23, 2024

(65) Prior Publication Data

US 2024/0161751 A1 May 16, 2024

Related U.S. Application Data

(63) Continuation of application No. 17/410,791, filed on Aug. 24, 2021, now Pat. No. 11,915,702.

(60) Provisional application No. 63/069,838, filed on Aug. 25, 2020.

(51) Int. Cl.
*G10L 15/26* (2006.01)
*G06N 7/01* (2023.01)
*G10L 15/02* (2006.01)
*G10L 15/22* (2006.01)

(52) U.S. Cl.
CPC ............... *G10L 15/26* (2013.01); *G06N 7/01* (2023.01); *G10L 15/02* (2013.01); *G10L 15/22* (2013.01); *G10L 2015/221* (2013.01)

(58) Field of Classification Search
CPC ......... G10L 15/26; G10L 15/02; G10L 15/22; G10L 2015/221; G06N 7/01
See application file for complete search history.

(56) References Cited

U.S. PATENT DOCUMENTS

| 10,573,312 | B1* | 2/2020 | Thomson | G10L 15/22 |
| 2007/0071206 | A1* | 3/2007 | Gainsboro | H04M 3/42221 379/168 |
| 2021/0185276 | A1* | 6/2021 | Peters | G06V 20/41 |

(Continued)

*Primary Examiner* — Mohammad K Islam
(74) *Attorney, Agent, or Firm* — OPWII, LLC

(57) ABSTRACT

The current document is directed to a methods and systems that use observational data collected by various devices and sensors to generate electronic-data representations of human conversations. The implementations of these methods and systems, disclosed in the current document, provide a highly extensible and generic platform for converting observational data into affect-annotated-timeline outputs that provide both a textual transcription of a conversation and a parallel set of affect annotations to the conversation. The affect-annotated-timeline outputs may be useful to researchers and developers, but also serve as inputs to any of a wide variety of downstream analytical processes and analysis systems that are, in turn, incorporated into many different types of special-purpose analysis and control systems.

16 Claims, 26 Drawing Sheets

(56) References Cited

U.S. PATENT DOCUMENTS

2022/0086393 A1* 3/2022 Peters .................... G06V 20/41
2023/0290351 A1* 9/2023 Sindhwani .............. G06F 3/167
704/235

* cited by examiner

| Negative | |
|---|---|
| 0 | contempt/belligerence |
| 1 | domineering/defensive/anger |
| 2 | sadness/whining |
| 3 | tension |

— 602

| Neutral | |
|---|---|
| 4 | neutral |

— 604

| Positive | |
|---|---|
| 5 | validation |
| 6 | interest |
| 7 | joy/affection |
| 8 | humor |

— 606

AUTOMATED SYSTEMS AND METHODS THAT GENERATE AFFECT-ANNOTATED TIMELINES

CROSS-REFERENCE TO RELATED APPLICATIONS

This application is a continuation of application Ser. No. 17/410,791, filed Jul. 19, 2012, which claims the benefit of Provisional Application No. 63/069,838, filed Aug. 25, 2020.

TECHNICAL FIELD

The current document is directed to automated systems that detect and analyze human behavior patterns and, in particular, to methods and systems that process data collected during a conversation in order to generate an affect-annotated timeline of the conversation.

BACKGROUND

During the past 50 years, the development and evolution of processor-controlled electronic systems, electronic communications, and electronic sensors and recorders have provided a foundation for the development and commercialization of a wide variety of different types of new technologies, products, and technological fields. Many of the new technologies are related to human social interactions and activities. These include many different types of social-networking systems and applications, Internet-enabled commerce and transactions, a wide variety of interactive systems and methods providing extensive human-to-computer and computer-to-human information-exchange interfaces, automated counseling services, automated advisors different agents, and many other technologies. Initially, these technologies employed relatively straightforward, text-based human-to-computer and computer-to-human interfaces. However, as the types of desired interfaces and the desired capabilities of such interfaces have expanded, it has become increasingly evident that further progression in human-to-computer and computer-to-human interfaces need to incorporate methods and systems for inferring emotional components of human-to-computer interfaces. Human behaviors and actions driven, at least in part, by human emotional states constitute a significant portion of the information exchanged between humans during social interactions, and humans have developed sophisticated mechanisms for inferring and responding to others' emotional states. Human-to-computer and computer-to-human interfaces, by contrast, generally fail to take into account emotional states and associated behaviors. While a relatively large amount of scientific and technological research has been carried out in order to understand human behaviors driven by emotional states, current automated technologies fall far short of the capabilities that would allow for emotionally competent human-to-computer and computer-to-interfaces. Researchers, developers, and, ultimately, users of computer-based technologies continue to seek improved, emotionally competent human-to-computer and computer-to-human interfaces in order to advance the many different types of technologies related to human social interactions and activities.

SUMMARY

The current document is directed to a methods and systems that use observational data collected by various devices and sensors to generate electronic-data representations of human conversations. The implementations of these methods and systems, disclosed in the current document, provide a highly extensible and generic platform for converting observational data into affect-annotated-timeline outputs that provide both a textual transcription of a conversation and a parallel set of affect annotations to the conversation. The affect-annotated-timeline outputs may be useful to researchers and developers, but also serve as inputs to any of a wide variety of downstream analytical processes and analysis systems that are, in turn, incorporated into many different types of special-purpose analysis and control systems.

DETAILED DESCRIPTION

Figure 1:
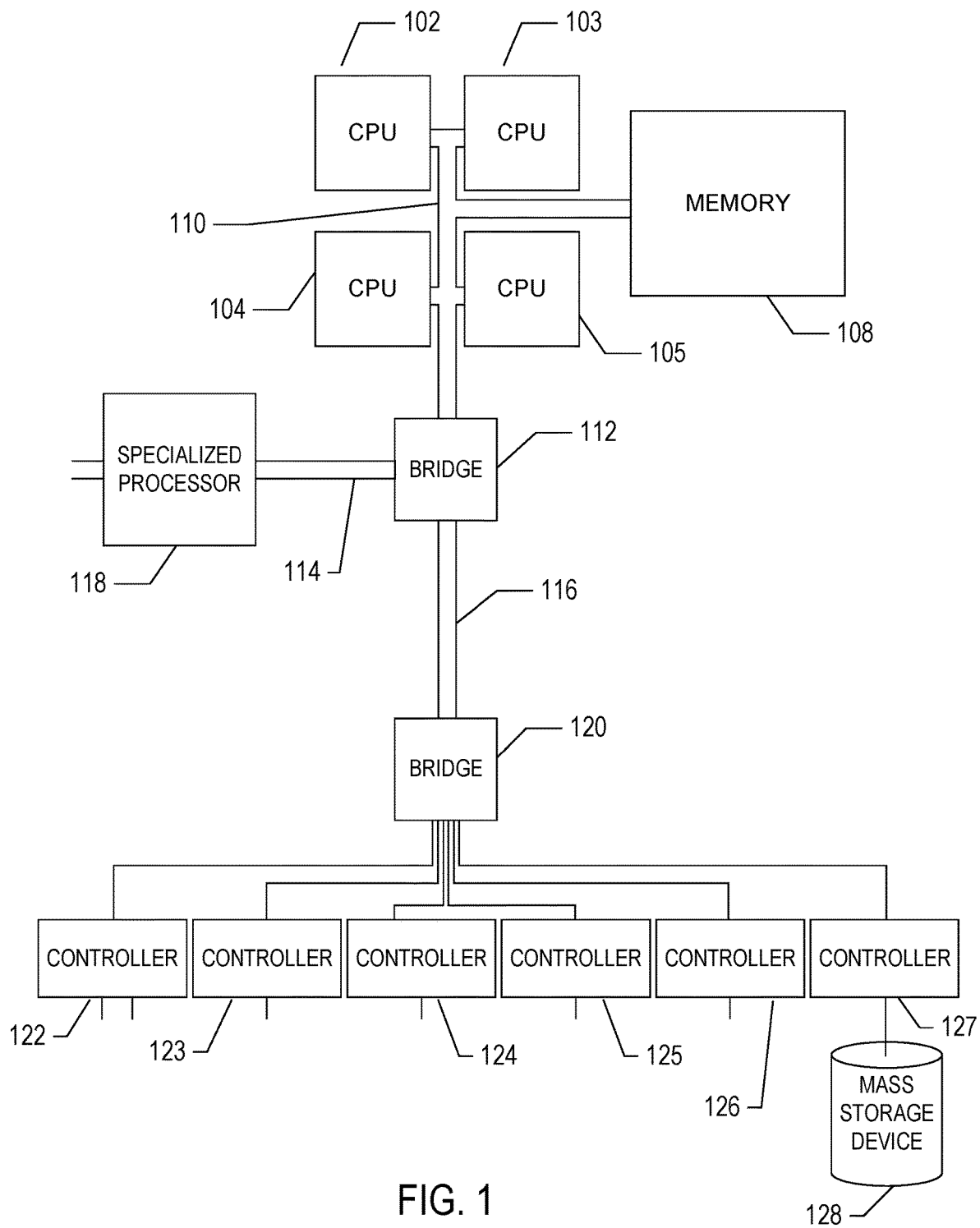
FIG. 1 provides a general architectural diagram for various types of computers.

The current document is directed to automated systems that detect and analyze human emotions. In a first subsection, below, a detailed description of computer hardware, complex computational systems, and virtualization is provided with reference to FIGS. 1-5B. In a second subsection, the currently disclosed methods and systems are discussed with reference to FIGS. 6-21.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
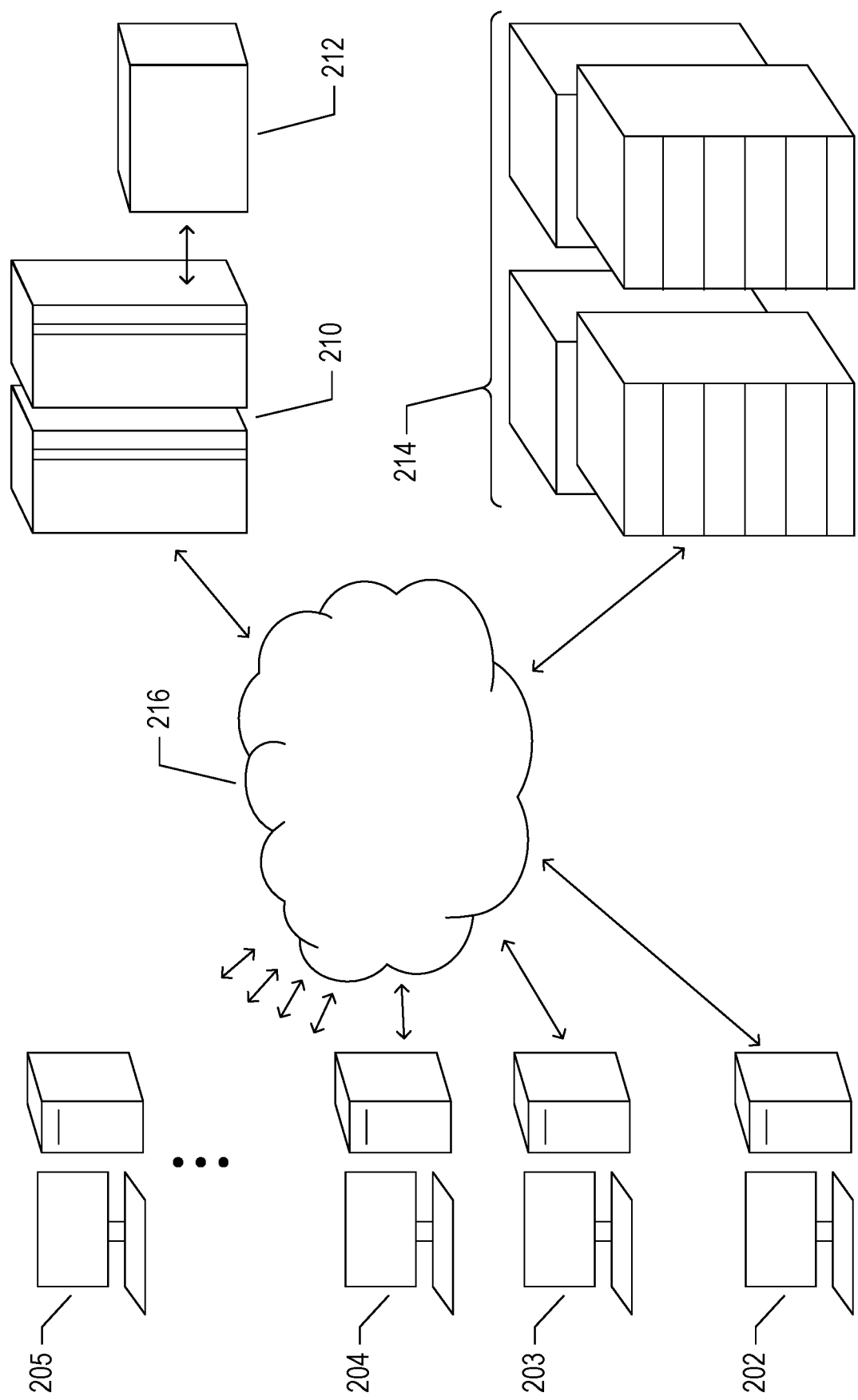
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
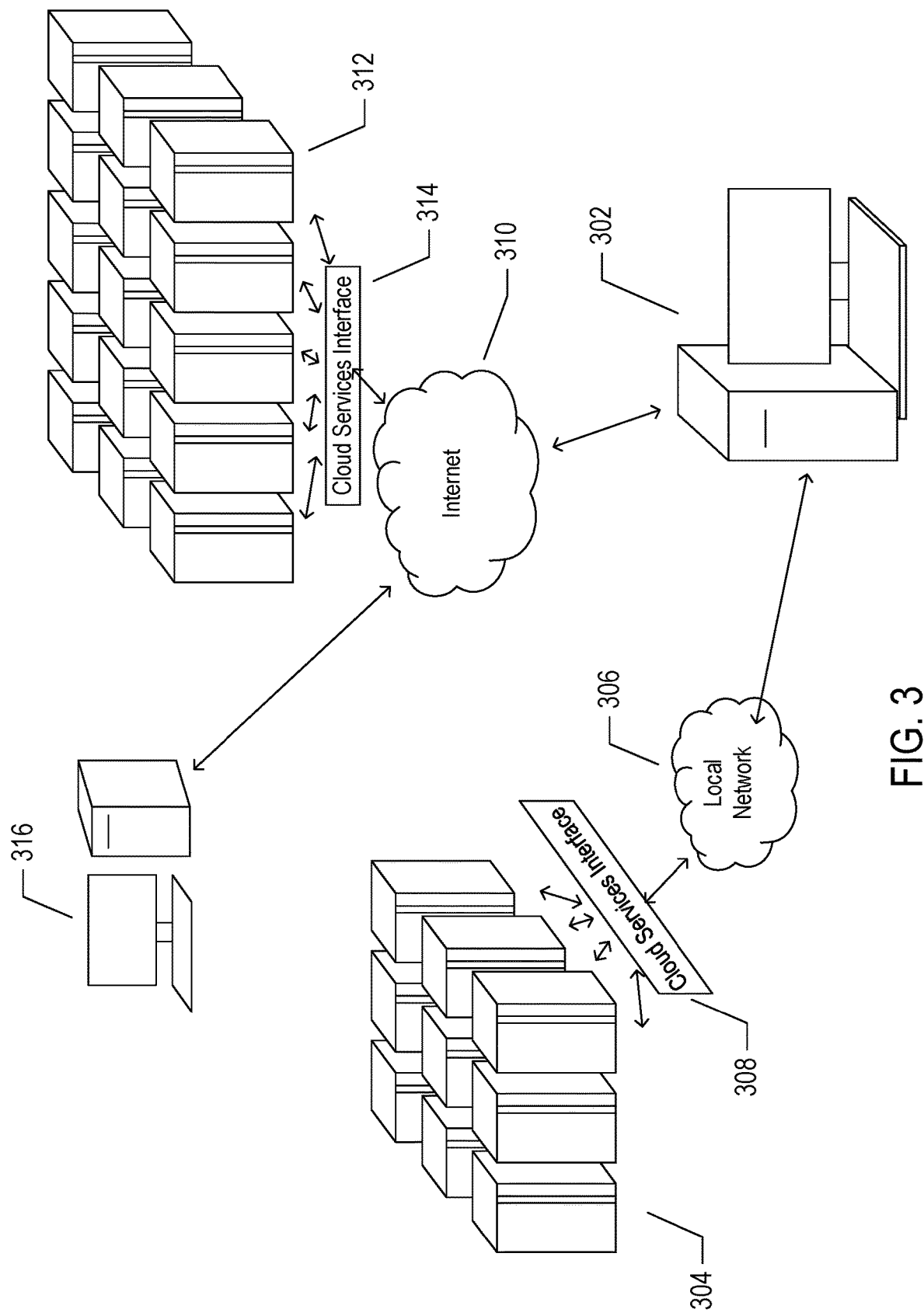
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
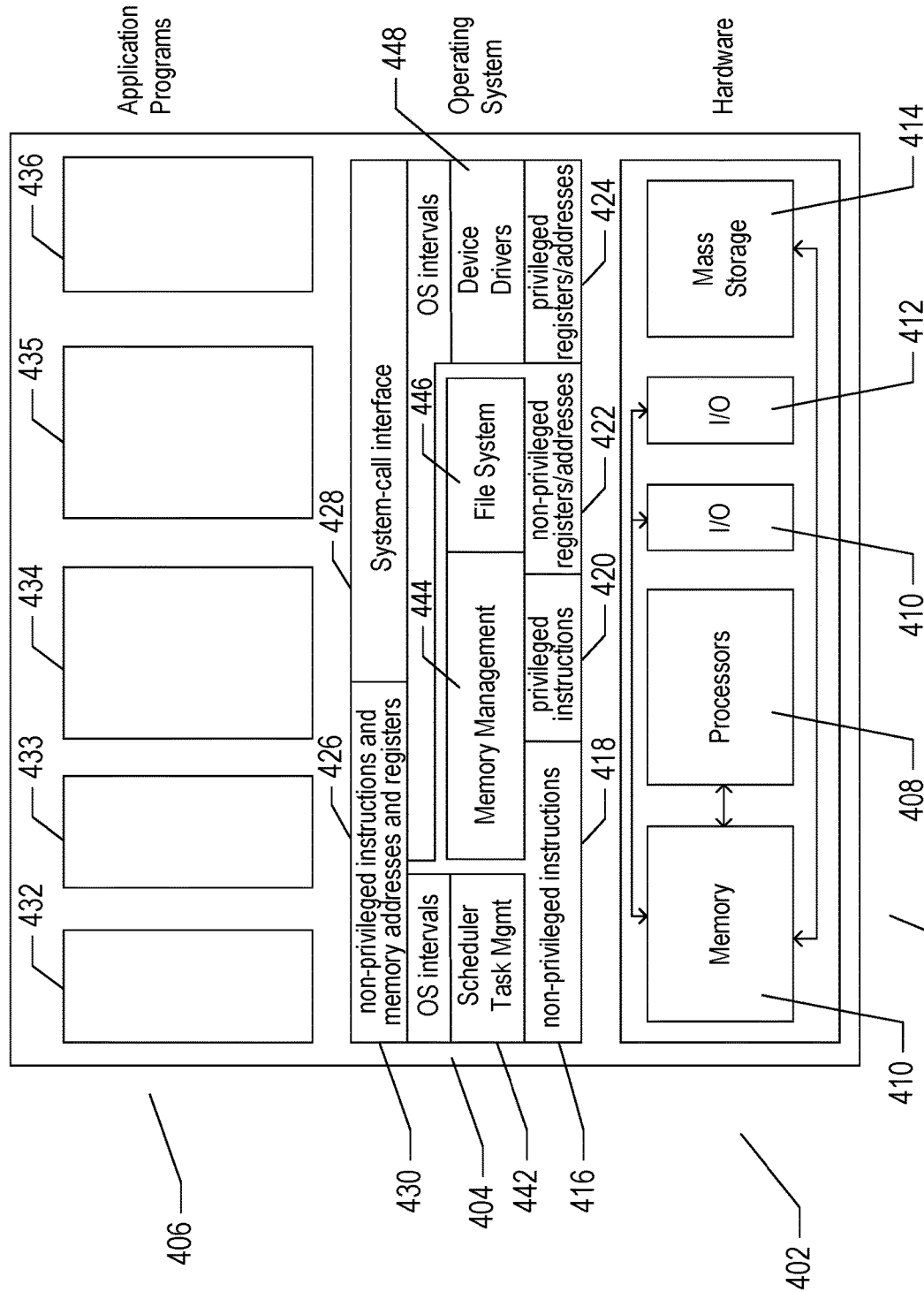
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
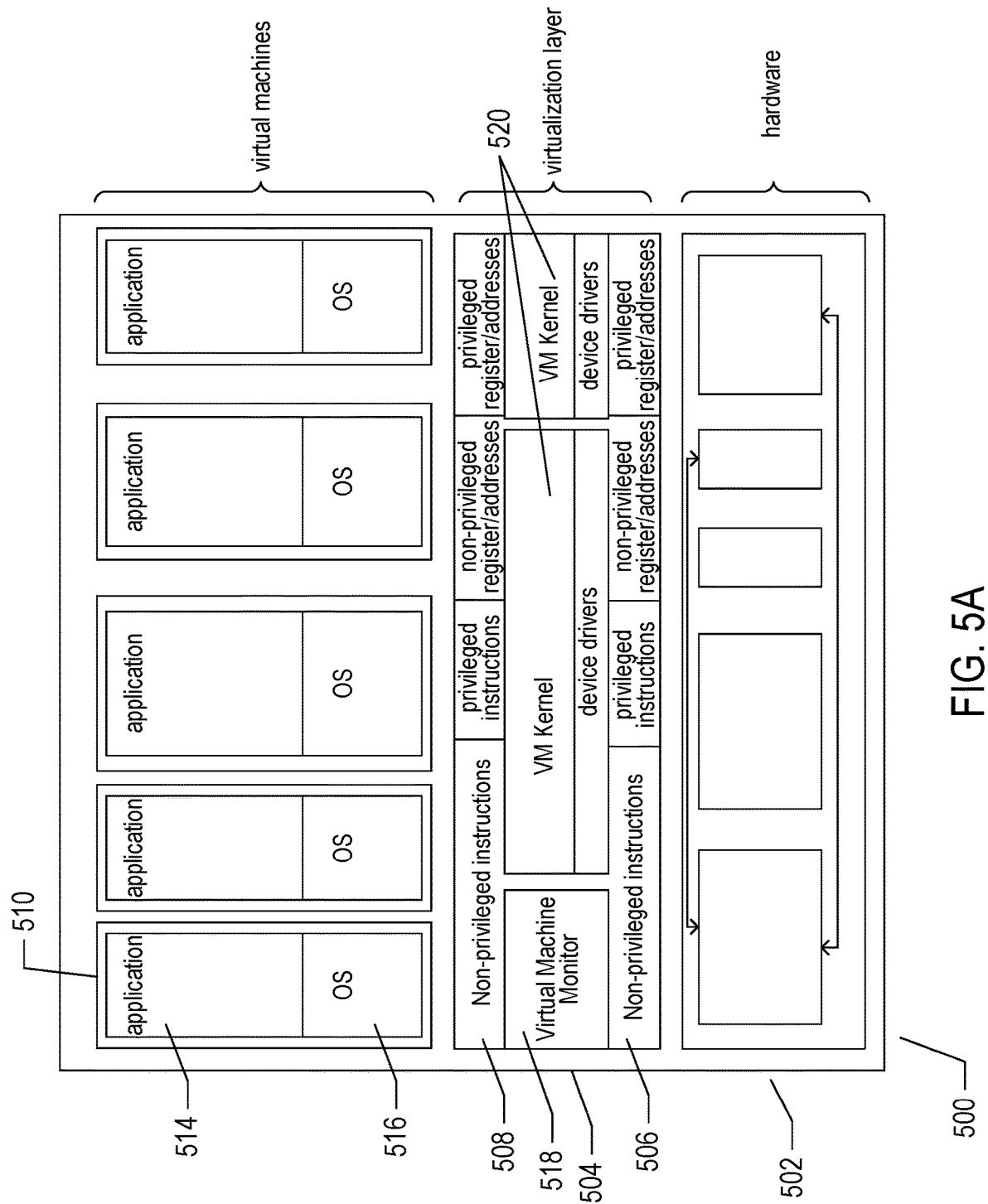
FIGS. 5A-B illustrate two types of virtual machine and virtual-machine execution environments.
Figure 5B:
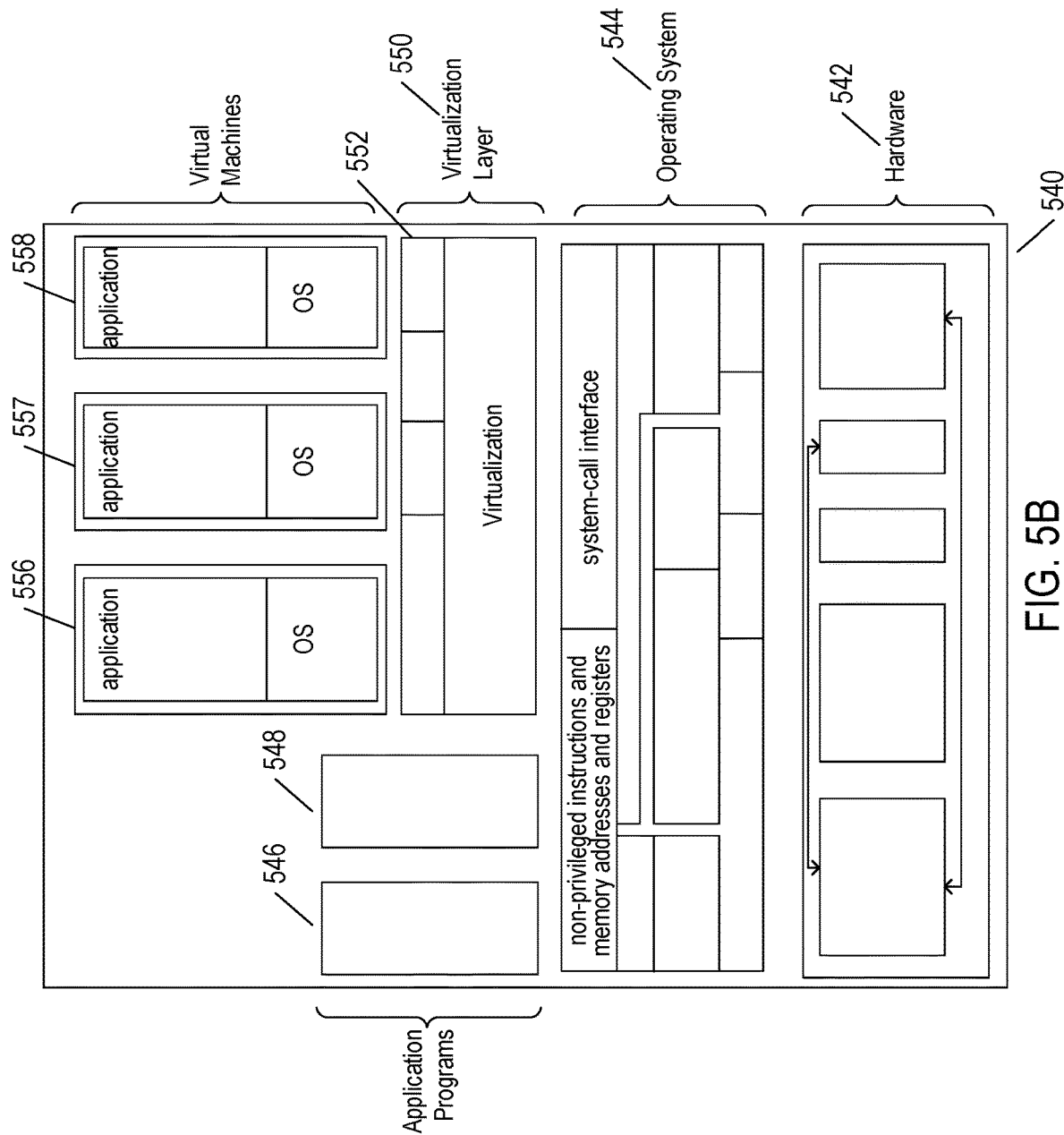

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

The currently disclosed methods and systems are implemented in computer systems, including standalone computer systems and as application running within data centers and cloud-computing facilities. The currently disclosed systems are thus physical systems that receive various types of observational data and produce output data structures containing the results of analyzing the observational data. These output data structures can be displayed to a user, stored in mass-storage devices for subsequent use, and transmitted as inputs to a variety of analytical systems that use the results to conduct further analyses and produce various type of data results and control inputs to control various types of systems.

Currently Disclosed Methods and Systems

Figures 6A, 6B:
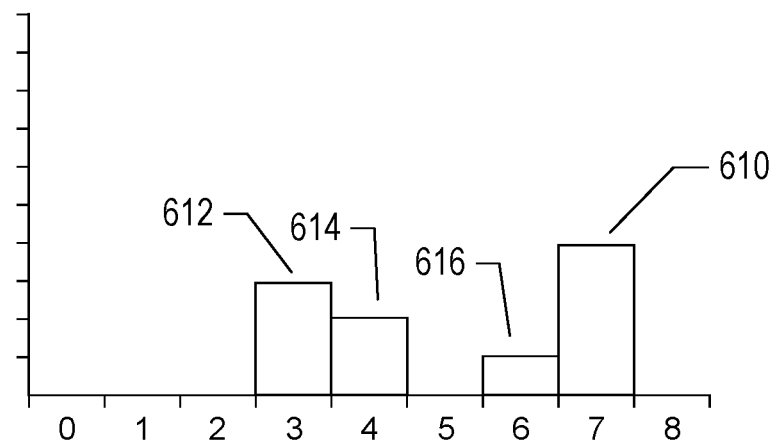
FIG. 6A shows a modified set of SPAFF codes used in certain implementations of the currently disclosed methods and systems.
FIG. 6B shows a histogram-like representation of probabilities that a particular emotional state corresponds to each of the affect codes in the affect coding system illustrated in FIG. 6A.

The Specific Affect Coding ("SPAFF") system was created by John Gottman to quantify affective behavior between two interlocutors. In this context, the term "affect" refers to behavioral patterns, physiological conditions and states, and other observables that are reflective of the emotional states and/or intentions of one or more humans. Since its creation, SPAFF has been recognized as one of the most useful and accurate systems for affective analysis of diverse human relationships and human interactions. FIG. 6A shows a modified set of SPAFF codes used in certain implementations of the currently disclosed methods and systems. There are nine different codes in this modified set of SPAFF codes, each represented by an integer in the range [0, 8]. Table 602 lists the negative codes in the modified set of SPAFF codes, which include: (0) contempt/belligerence; (1) domineering/defensive/anger; (2) sadness/whining; and (3) tension. Table 604 lists the single neutral code: (4) neutral. Table 606 lists the positive codes in the modified set of SPAFF codes: (5) validation; (6) interest; (7) joy/affection; and (8) humor. The modified set of SPAFF codes shown in FIG. 6A represent one of many different possible affect coding systems that can be used in various different implementations of the currently disclosed methods and systems. The modified set of SPAFF codes shown in FIG. 6A have been determined, through extensive development and training efforts, to be both comprehensive and effective for automated emotional-state-and-intention inference and analysis. In the following discussion, the phrase "affect coding system" is used to generally refer to any of many possible affect coding systems, including the affect coding system shown in FIG. 6A, and the phrase "affect code" is used to refer to a particular code of an affect coding system, such as the code domineering/defensive/anger with integer value 1 in the affect coding system shown in FIG. 6A.

FIG. 6B shows a histogram-like representation of probabilities that a particular emotional state or intention corresponds to each of the affect codes in the affect coding system illustrated in FIG. 6A. The histogram-like representation shown in FIG. 6B indicates that a particular emotional state or intention has a 40% probability of corresponding to the affect code joy/affection, as represented by column 610, a 30% probability of corresponding to the affect code tension, as represented by column 612, a 20% probability of corresponding to the affect code neutral, as represented by column 614, a 10% probability of corresponding to the affect code interest, as represented by column 616, and a 0% probability of corresponding to any of the remaining affect codes. As further discussed below, the currently disclosed methods and systems generate discrete affect-code probability distributions ("ACPD"), such as that shown in FIG. 6B, for each conversational unit within an observed conversation. In many cases, an ACPD may indicate that a particular affect code represents the emotional state of the speaker in a particular conversational entity. In less frequently encountered cases, the probabilities may be relatively evenly distributed among a subset of the affect codes, indicating that the emotional state of a speaker in the conversational unit could not be unambiguously determined.

Figure 7:
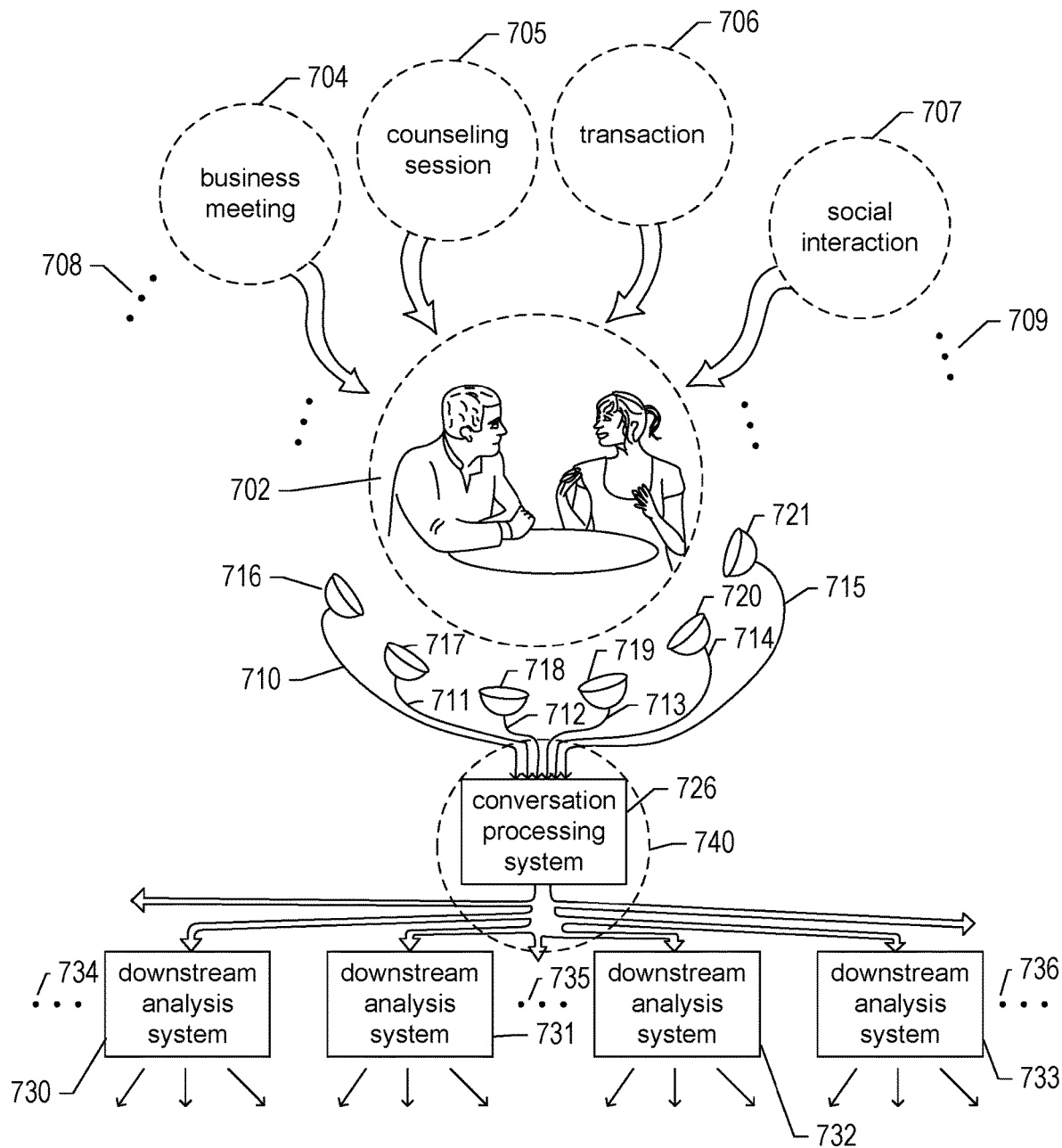
FIG. 7 illustrates a general context for the currently disclosed methods and systems.

FIG. 7 illustrates a general context for the currently disclosed methods and systems. The fundamental observable for the currently disclosed methods and systems is a conversation, as represented by two speakers conversing with one another within a dashed circle 702. However, a conversation may not only occur between two human participants, but may also occur among three or more human participants, between a human participants and an interactive application running on a computer system, and among multiple human participants and an interactive application running on a computer system. In the most general case, a conversation involves information exchange between at least one human participant and at least one additional participant. In the following discussion, a conversation between two human participants is generally used as an exemplary conversation for discussing the currently disclosed methods and systems, but the currently disclosed methods and systems can be applied to any of various different types of conversations that fall under the category of a general conversation, as discussed above. In the future, conversations may even include interactions between two or more automated systems.

A conversation may occur within the context of a wide variety of different types of higher-level interactions, activities, and interfaces, as indicated in FIG. 7 by the dashed circles 704-707 and by ellipses 708-709 indicating that there may be many other types of higher-level interactions, activities, and interfaces in addition to the particular interactions, activities and interfaces represented by circles 704-707. As shown in FIG. 7, a conversation may occur within the context of a business meeting 704, in which two participants in the business meeting exchange observations with one another over a period of time. A conversation may also occur within a monitored counseling session 705, in which two participants in the counseling session discuss selected topics. A conversation may occur during any of many different types of transactions 706, such as when a customer interfaces to a human or automated salesperson directly, in person, via a phone call, via a text-message exchange, or by other communications means. The conversation may occur in the context of some broader social interactions 707, such as a question-and-answer session following a public lecture.

The currently disclosed methods and systems generally rely on multiple different data inputs 710-715 produced by multiple different associated devices or sensors 716-721 for the raw observational data that is processed to generate a data representation of the conversation. Many different types of data inputs may be generated and used by the currently disclosed methods and systems. These may include audio recordings of the conversation, video recordings of the conversation, outputs from various types of physiological sensors, outputs from devices into which conversation participants and/or human observers input subjective annotations of the conversation, and many other types of signals. These data inputs are input as data streams or data files to a conversation-processing system 726 representing an implementation of the currently disclosed systems that incorporate the currently disclosed methods. The conversation-processing system generates an affect-annotated representation of a monitored conversation that is output to any of various different targets, including one or more downstream analysis systems 730-733 with additional targets represented by ellipses 734-736. The affect-annotated representation of a conversation may be, for example, viewed by human analysis or stored in various types of electromechanical and electro-mechanical-optical data-storage systems in addition to, or instead of, being forwarded to downstream analysis systems. The downstream analysis systems may use the affect-annotated representation of a conversation produced by the conversation-processing system 726 to carry out higher-level analyses related to the overall context of the conversation. For example, in the case of a conversation that takes place in the context of a business meeting 704, the higher-level downstream analysis subsystem may evaluate the performances of the participants in the business meeting in order to provide feedback to the participants to improve their performances at subsequent business meetings. Alternatively, the higher-level downstream analysis subsystem may attempt to associate credibility metrics with the participants, to facilitate post-business-meeting decisions based on information exchange during the business meeting. In the case of conversations in the context of a counseling session 705, the downstream analysis subsystem may analyze the conversation to generate higher-level observations and commentaries related to the relationship between the participants of the conversation, pointing out both productive and non-productive approaches and tactics employed by the participants in the conversation. In the case of a transaction context 706, the downstream analysis subsystem may attempt to evaluate the performance of a human or automated salesperson or, in real time, may attempt to detect opportunities for better assisting a customer or for promoting additional products and services to the customer. There are a plethora of different possible applications, analytical systems, and control systems that use the affect-annotated representations produced by the currently disclosed methods and systems, represented in FIG. 7 by the conversation-processing system 726, for a wide variety of different purposes.

Dashed circle 740 indicates that it is the conversation-processing system that is the subject of the current document. It should be noted that this conversation-processing system is a tangible, physical, electromechanical system that receives various different types of input signals and produces affect-annotated representations of conversations that can be physically stored in data-storage systems, displayed to users on display devices, and electronically communicated to downstream analysis and control systems as inputs, using which the downstream systems produce higher-level types of outputs and analyses of particular utility in the contexts in which the conversations occur. The conversation-processing system 726 does not represent a set of tasks that can be manually carried out by humans. The conversation-processing system 726 processes, in parallel, multiple data streams with microsecond or sub-microsecond resolution, generating complex data structures that store processing results obtained by complex operations on the input data and by complex processing of ACPDs generated as intermediate results of various types of analytical modules running in parallel within the conversation-processing system 726.

Figure 8:
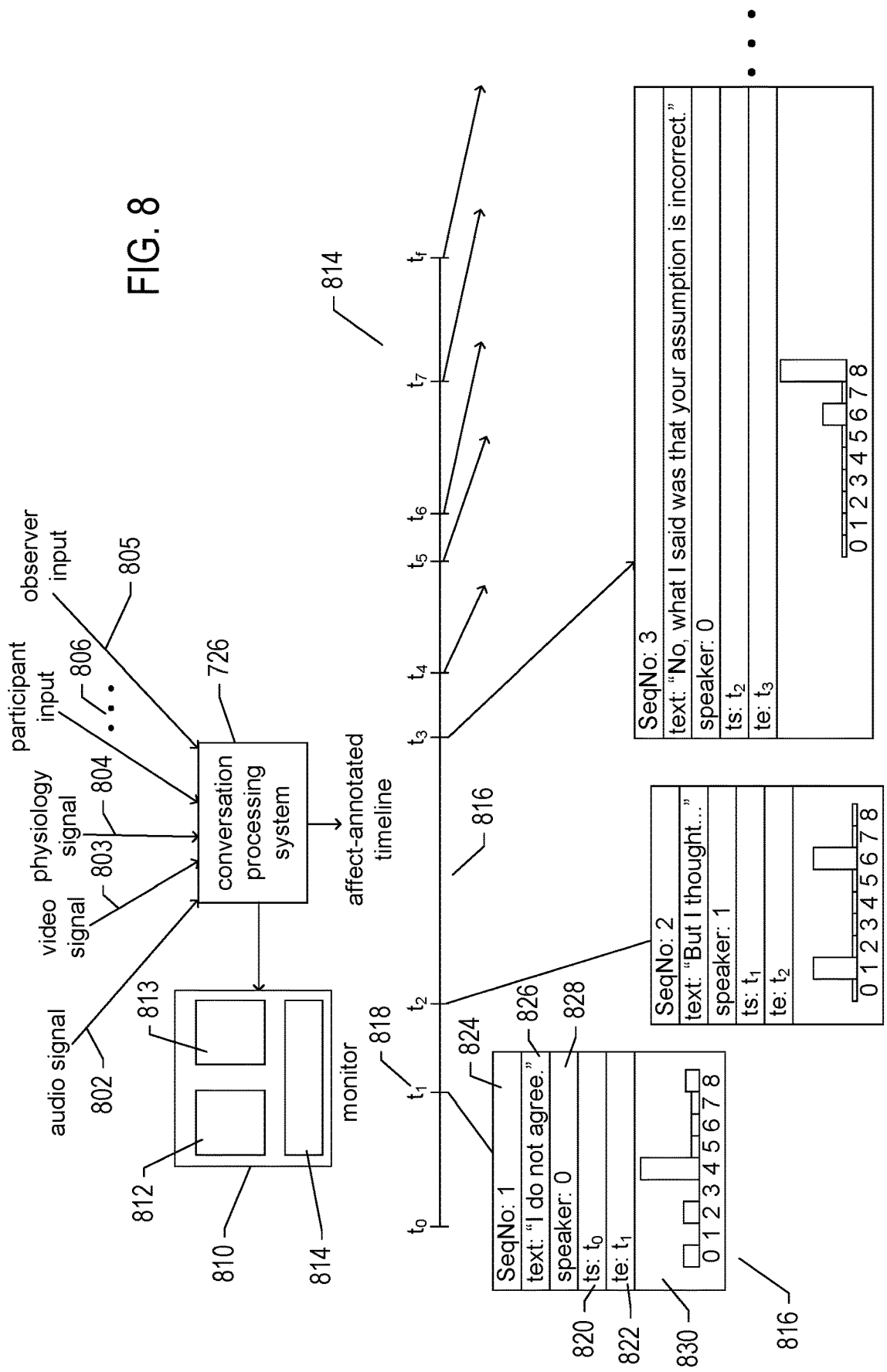
FIG. 8 illustrates an affect-annotated-timeline data structure output by the conversation-processing system that represents the currently disclosed methods and systems.

FIG. 8 illustrates an affect-annotated-timeline data structure output by the conversation-processing system that represents the currently disclosed methods and systems. As discussed above, the conversation-processing system 726 receives multiple input data streams and/or data files 802-805, with ellipsis 806 representing additional possible data inputs. Of course, in certain implementations, the conversation-processing system may operate with only one or a few input data inputs, but, in general, the more data inputs, the greater the precision and reliability with which the conversation-processing system can assign affect codes to conversation units, as discussed further below.

Certain implementations of the conversation-processing system 726 provide a real-time monitor 810 that displays information collected and analyzed by the conversation-processing system, including videos of the participants 812-813 and various metrics and results 814. The conversation-processing system generates an affect-annotated-timeline data structure 814 for each processed conversation. The example affect-annotated-timeline data structure 814 is graphically represented in FIG. 8. In general, the affect-annotated-timeline data structure is a collection or set of affect-annotation records, such as affect-annotation record 816. The affect-annotated-timeline data structure includes one affect-annotation record for each conversation unit identified within the conversation. Conversation units are based on units of language for affect coding ("ULACs"), discussed in greater detail below. A LILAC is defined to mean the minimal aggregation of words that conveys intra-contextual meaning. In practice, most ULACs are sentences, but ULACs can also comprise non-sentence expressions or independently understandable phrases or clauses within a sentence. Conversation units can therefore correspond to intervals of different lengths within the time interval corresponding to the conversation. In the representation of the example affect-annotated-timeline data structure 814 in FIG. 8, the affect-annotated-timeline data structure comprises a timeline 816 with marked time points, such as time point $t_1$ 818, corresponding to conversation-unit boundaries. In fact, an affect-annotated-timeline data structure does not contain a graphical representation of the timeline, but instead includes indications of the time interval corresponding to the ULACs associated with the affect-annotation records, such as the starting time 820 and end time 822 of the conversation unit represented by affect-annotation record 816. Alternatively, a start-time/time-interval-length pair or an end-time/time-interval-length pair can be used to indicate the time interval corresponding to an affect-annotation record. In addition, in the described implementation, an affect-annotation record includes a sequence number 824, the textual transcription of what is spoken in the conversational unit 826, an indication of which speaker was speaking during the conversational unit 828, and a representation of the ACPD 830 generated by the conversation-processing system for the conversation unit. In certain implementations, a single affect code is included in the affect-annotation record in place of an ACDP. Thus, both the start and end times 820 and 822 and/or the sequence number 824 can be used to order the affect-annotation records of an affect-annotated-timeline data structure in time. The phrase "affect-annotated-timeline data structure" is used, in this discussion, to emphasize the time-ordered nature of the information contained in the multiple affect-annotation records of an affect-annotated-timeline data structure.

Considering only the natures of the data inputs to, and output from, the conversation-processing system, it should be intuitively obvious that the conversation-processing system carries out a complex, computationally-intensive set of tasks in order to convert various different types of input signals, such as audio, video, and physiology-sensor-generated signals, into the affect-annotated-timeline data structure. It should also be intuitively obvious that no human observer could possibly manually generate an affect-annotated-timeline data structure while observing a conversation. A trained human user could likely produce a transcription of what is said by the participants in the conversation, but could not generate a set of affect-annotation records, in real time. Manual SPAFF encoding has been used, in research settings, for after-the-fact annotation of recorded conversations, using a variety of different types of information. However, after-the-fact manual affect encoding does not provide the accuracy, precision, and repeatability that can be obtained, in real time, by an automated conversation-processing system, and the accuracy, precision, and repeatability provided by the currently disclosed methods and systems are vital for many downstream uses of the out affect-annotated-timeline data structures. An automated conversation-processing system applies the same analytical approaches to each and every conversation, without subjective interpretations and emotional responses inherent in even well-trained human affect encoders. For this reason alone, an automated conversation-processing system provides far greater repeatability and objective accuracy than can possibly be obtained by even teams of trained human affect encoders. But there are many other technical capabilities of an automated conversation-processing system that cannot be provided by trained human affect encoders. An automated conversation-processing system can synchronize and analyze the input-signal data streams at microsecond or better granularity, and can detect subtle physiological changes in the participants, subtle changes in tone, inflection, and pronunciation undetectable by a human observer, and can generate a final ACPD by statistically meaningful combinations of multiple intermediate ACPDs generated by multiple different modules within the conversation-processing system that operate in parallel on different combinations of the input-data streams.

Figure 9:
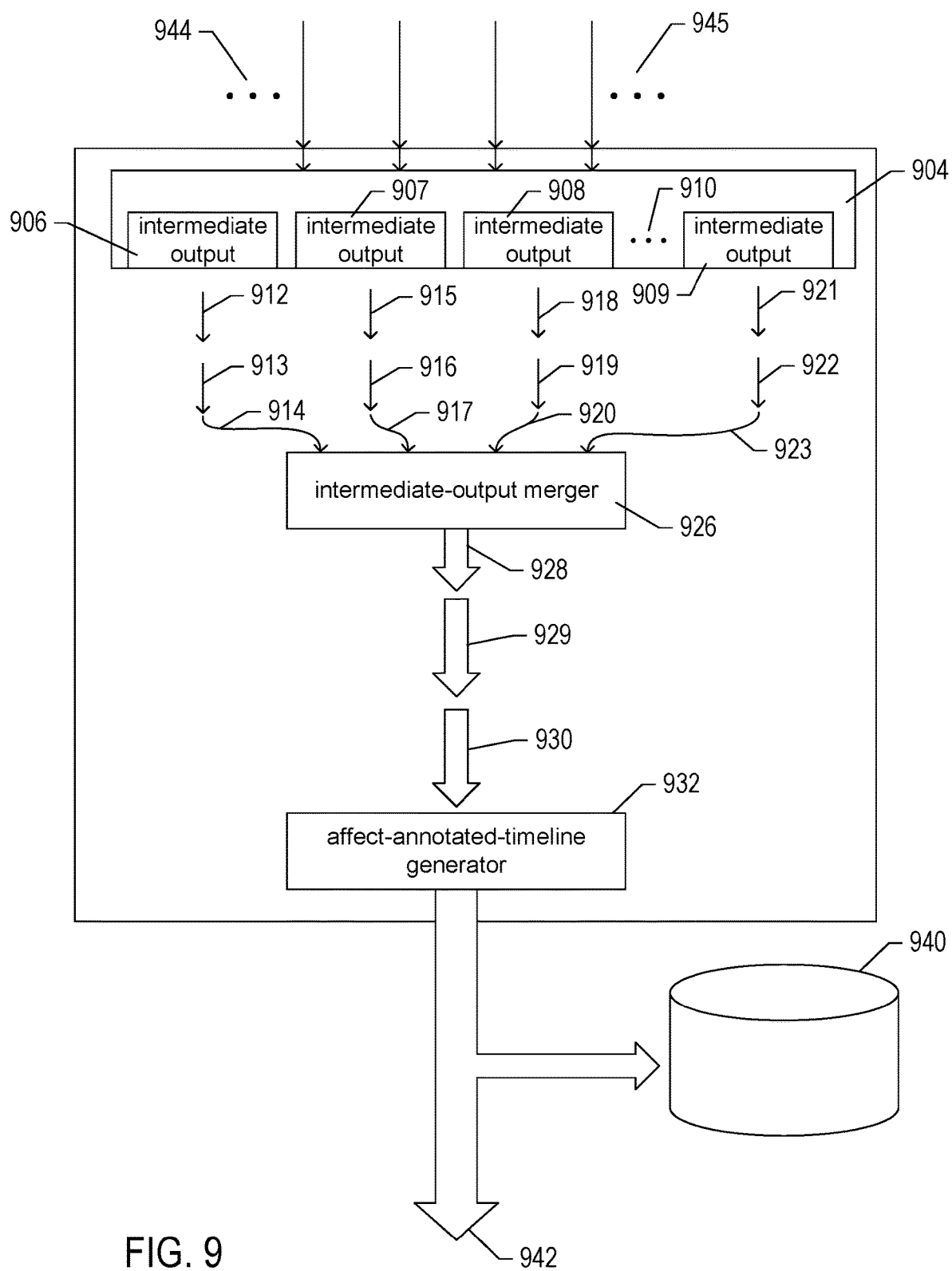
FIG. 9 illustrates several features of the currently disclosed methods and systems.

FIG. 9 illustrates several features of the currently disclosed methods and systems. In FIG. 9, the conversation-processing system 902 is shown to include an input-analysis subsystem 904 with numerous modules 906-909, with ellipsis 910 represented potential additional modules. The various modules represent different types of analyses that are carried out, in parallel, by the conversation-processing system. The different modules each produce a sequence of output ACPDs, represented by arrows 912-923, corresponding to the sequence of conversation units within the conversation. For each conversation unit, or sub-interval of time within the conversation, an intermediate-output merger component 926 merges the ACPDs output by each of the modules for a conversation unit into a final result ACPD, and outputs a sequence of result ACPDs, represented by arrows 928-930, to an affect-annotated-timeline generator 932 which generates and outputs an affect-annotated-timeline data structure for the conversation. Of course, in certain implementations, the conversation-processing unit may output an affect-annotated-timeline data structure as a sequence of affect-annotation records while, in other implementations, the conversation-processing unit may locally store affect-annotation records in order to output a complete affect-annotated-timeline data structure at the termination point of the observed conversation. The output affect-annotated-timeline data structure may be stored for subsequent use 940 and may be output to various target entities 942 including one or more display devices and one or more downstream analysis and/or control systems.

FIGS. 6-9, in addition to providing an overview of the currently disclosed methods and systems, highlight a number of high-level features of the currently disclosed methods and systems. These features include division of the entire time interval of the conversation into conversation units based on ULACS, generation of affect-annotated-timeline data structures comprising multiple affect-annotation records, and generation of ACPDs both as intermediate outputs of various intermediate modules within the conversation-processing system and as final affect-annotations included in the affect-annotated-timeline data structure or used to select most likely affect codes that are instead included in the affect-annotated-timeline data structure. An additional important feature of the currently disclosed methods and systems is the extensible nature of the conversation-processing system, as represented by ellipsis 910 and ellipses 944-945 in FIG. 9. Because each internal module outputs an ACPD, it is relatively straightforward to add additional internal modules corresponding to additional analytical processes to the conversation-processing system. This involves only directing relevant input-data streams to the additional internal modules and updating the intermediate-output-merger system to incorporate the additional intermediate ACPDs output by the additional internal modules into the final result APCD. Ellipses 944-945 indicate that additional types of data inputs generated by additional types of devices and sensors can also be easily incorporated in the conversation-processing system by directing the use additional data inputs to those internal modules updated to use them. Because conversation processing is a rapidly evolving field, it is vital that a conversation-processing system be designed for rapid and straightforward extensions to incorporate additional input signals and analytical methods.

The described implementations of the methods and systems disclosed in this document involve multi-modal classification, including natural-language processing ("NLP"), prosodic classification, visual classification, and various types of physiological classifications, implemented as a mix of machine learning, deep learning, and expert-defined rule-based techniques. In one example implementation, visual, tonal, and textual cues are extracted from raw data consisting of mixed-length videos of two or more people engaging in an emotionally valent conversation video. Audio information is extracted from the video streams or video files along with sequences of frames, or images. The extracted audio information, in turn, is used to extract text and prosodic features. Physiology data is also extracted from the visual frame data. The data is used to separately compute intermediate ACPDs for each of multiple modes, or modules, including text, prosody, and visual modes. The intermediate ACPDs are merged to generate result ACPDs for each conversation unit identified within the observed conversation. In five following subsections, various aspects of one implementation of the conversation-processing system, for which an overview is provided, above, with reference to FIGS. 6-9, are discussed in detail.

Text Data Extraction and Natural Language Processing
Speech-to-Text Processing

From each audio stream or audio file, a textual transcript is created by merging the data from two automated third-party speech-to-text services. A first speech-to-text service, IBM Watson, provides accurate speaker diarization labels. Speaker diarization labels are symbolic labels associated with textual portions of a transcript that indicate which speaker spoke the sentence, phrase, or term that was converted into a particular textual portion of a transcript. A second speech-to-text service, Rev.ai, provides low word error rate and appropriate punctuation. The two transcripts are synchronized, merging speaker diarization labels and the words based on nearest word-level timestamps.

Audio files are created by extracting audio from video using ffmpeg into a flac audio file container. Each audio file is input to IBM Watson and Rev.ai for speech-to-text transcription. Each third-party speech-to-text service returns two files. One file contains chunks of words separated by speaker label to create a human-readable transcript. A second file contains raw JavaScript Object Notation ("JSON") output. While the raw JSON output from each service is structured differently, they both contain timestamps and speaker labels for each word transcribed. They are each parsed into respective csv files containing four columns for the word, the start time, the stop time, and the speaker label, as shown in two short examples, provided below:

---

IBM JSON
[
    ("Um,", 0, 0.00, 0.11),
    ("I,", 0, 0.92, 1.05),
    ("told", 0, 1.21, 1.42),
    ("the", 0, 1.53. 1.91),
    ("parents", 0, 2.01, 2.44),
    ("that", 0, 2.51, 2.62),
    ("we", 0, 3.63, 3.71),
    ("could", 0, 3.74, 3.95),
    ("stay", 0, 4.01, 4.12),
    ("in", 0, 4.23, 4.25),
    ("our", 0, 4.34, 4.38),
    ("dune", 0, 4.41, 4.49),
    ("on,", 0, 4.53, 4.59), -continued

```
    ("this", 0, 4.64, 4.69),
    ("weekend", 0, 4.71, 5.22),
    ("So", 0, 5.33, 5.51),
    ("were,", 0, 6.54, 6.55),
    ("just", 0, 8.51, 8.52),
    ("going", 0, 9.3. 10.61),
    ("to", 0, 12.81, 12.84),
    ("now", 0, 13.01, 13.52),
    ("on", 0, 13.53, 13.91),
    ("the,", 0, 14.54, 14.85),
    ("beach.", 0, 15.11, 15.52),
    ("Um", 0, 16.53, 16.91),
    ("are?", 0, 18.54, 18.85),
    ("You", 0, 19.51, 19.92),
    ("is", 0, 20.31. 20.61),
    ("this?", 0, 21.81, 21.84),
    ("are", 0, 22.51, 22.82),
    ("you", 0, 23.53, 23.61),
    ("okay,", 0, 23.94, 24.55),
    ("with", 0, 24.91,25.52)
    (that?", 1, 25.93, 26.51),
    ("You", 1, 28.54, 28.95),
    ("already", 1, 29.51, 30.12),
    ("sold", 1, 30.31. 30.81),
    ("this?", 1, 31.87, 32.04)
]
        REV AI JSON
[
    ("Um,", 0, 0.00, 0.12),
    ("I", 1, 0.93, 1.02),
    ("told", 1, 1.22, 1.41),
    ("my", 1, 1.54. 1.93),
    ("parents", 0, 2.02, 2.44),
    ("that", 0, 2.51, 2.62),
    ("they", 0, 3.65, 3.71),
    ("could", 0, 3.74, 3.96),
    ("stay", 0, 4.01, 4.12),
    ("in", 0, 4.23, 4.25),
    ("our", 0, 4.33, 4.38),
    ("room", 0, 4.44, 4.49),
    ("um,", 1, 4.53, 4.57),
    ("this", 1, 4.62, 4.69),
    ("weekend", 1, 4.71, 5.22),
    ("So", 0, 5.33, 5.51),
    ("we're,", 0, 6.44, 6.57),
    ("just", 0, 8.41, 8.42),
    ("going", 0, 9.32. 10.66),
    ("to", 0, 12.81, 12.84),
("go", 0, 13.03, 13.55),
    ("on", 0, 13.51, 13.93),
    ("the,", 0, 14.44, 14.75),
    ("couch.", 0, 15.21, 15.42),
    ("Um,", 1, 16.54, 16.91),
    ("are", 1, 18.58, 18.75),
    ("you,", 0, 19.52, 19.93),
    ("is", 0, 20.31. 20.61),
    ("that", 0, 21.82, 21.87),
("are", 0, 22.41, 22.62),
    ("you", 0, 23.33, 23.71),
    ("okay,", 0, 23.94, 24.65),
    ("with", 1, 24.91,25.52)
    (that?", 1, 25.93, 26.51),
    ("You", 1, 28.53, 28.96),
    ("already", 1, 29.31, 30.22),
    ("told", 1, 30.37. 30.83),
    ("them.", 0, 31.82, 32.14)
]
```

The two csv files are merged together using the start time column as a merge key. The start times may not have exact matches as the two speech-to-text services could differ by milliseconds or miss certain words altogether. To solve this problem, the merge is performed to the nearest previous start time. When merging, punctuation is associated with the preceding word so that it can be incorporated into the correct word grouping. The merged file includes words and timestamps extracted from the rev.ai csv file and speaker labels extracted from the IBM Watson csv file. A short example of the merged file is provided below, based on the above-provided short examples of csv files generated from JSON outputs from Rev.ai and IBM Watson:

```
[
    ("Um,", 0, 0.00, 0.11),
    ("I", 0, 0.92, 1.05),
    ("told", 0, 1.21, 1.42),
    ("my", 0, 1.53. 1.91),
    ("parents", 0, 2.01, 2.44),
    ("that", 0, 2.51, 2.62),
    ("they", 0, 3.63, 3.71),
    ("could", 0, 3.74, 3.95),
    ("stay", 0, 4.01, 4.12),
    ("in", 0, 4.23, 4.25),
    ("our", 0, 4.34, 4.38),
    ("room", 0, 4.41, 4.49),
    ("on,", 0, 4.53, 4.59),
    ("this", 0, 4.64, 4.69),
    ("weekend", 0, 4.71, 5.22),
    ("So", 0, 5.33, 5.51),
    ("were,", 0, 6.54, 6.55),
    ("just", 0, 8.51, 8.52),
    ("going", 0, 9.3. 10.61),
    ("to", 0, 12.81, 12.84),
    ("now", 0, 13.01, 13.52),
    ("on", 0, 13.53, 13.91),
    ("the,", 0, 14.54, 14.85),
    ("beach.", 0, 15.11, 15.52),
    ("Um", 0, 16.53, 16.91),
    ("are?", 0, 18.54, 18.85),
    ("You", 0, 19.51, 19.92),
    ("is", 0, 20.31. 20.61),
    ("this?", 0, 21.81, 21.84),
    ("are", 0, 22.51, 22.82),
    ("you", 0, 23.53, 23.61),
    ("okay,", 0, 23.94, 24.55),
    ("with", 0, 24.91,25.52)
    (that?", 1, 25.93, 26.51),
    ("You", 1, 28.54, 28.95),
    ("already", 1, 29.51, 30.12),
    ("sold", 1, 30.31. 30.81),
    ("this?", 1, 31.87, 32.04)
]
```

Unit of Language for Affect Coding Generation

Figure 10:
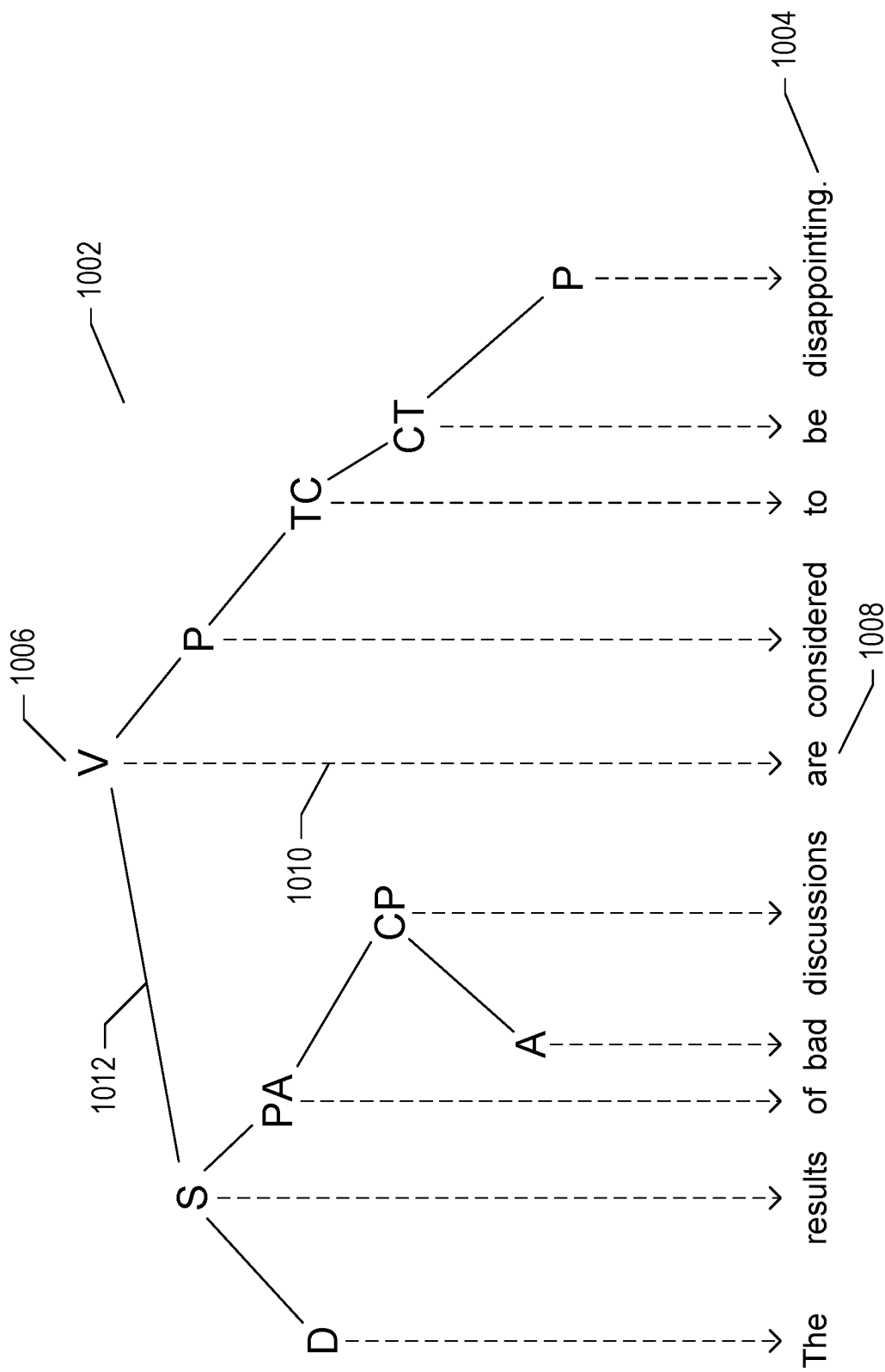
FIG. 10 shows an example lexical dependency graph.

Affect coding systems generally use a minimal level of context and, therefore, individual words are generally not suitable for generation of affect codes. As a result, words are aggregated into units of language for affect coding ("ULACs"), which are defined as the minimal aggregation of words to convey intra-contextual meaning. To do so, ULACs are identified based on lexical dependency graphs. FIG. 10 shows an example lexical dependency graph. In FIG. 10, a dependency graph 1002 is constructed above a sentence 1004 represented by the dependency graph. Each word in the sentence 1004 is represented by a node in the lexical dependency graph. The nodes comprise symbols indicating the part of speech of the word represented by the node. For example, the root node 1006 represents a verb, indicated by the symbol "V," and specifically represents the word "are" 1008, as indicated by dashed arrow 1010. The nodes in the lexical dependency graph are connected by edges, such as edge 1012. There are many different possible ways to construct lexical dependency graphs.

Lexical dependency graphs are used to define ULACs. As discussed above, the JSON outputs from the third-party speech-to-text services are merged to produce a textual transcript. Another example is provided below:

IBM WATSON JSON:
[
("Um,", 0, 0.00, 0.11),
("I,", 0, 0.92, 1.05),
("told", 0, 1.21, 1.42),
("the", 0, 1.53. 1.91),
("parents", 0, 2.01, 2.44),
("that", 0, 2.51, 2.62),
("we", 0, 3.63, 3.71),
("could", 0, 3.74, 3.95),
("stay", 0, 4.01, 4.12),
("in", 0, 4.23, 4.25),
("our", 0, 4.34, 4.38),
("dune", 0, 4.41, 4.49),
("on", 0, 4.53, 4.59),
("this", 0, 4.64, 4.69),
("weekend", 0, 4.71, 5.22),
("So", 0, 5.33, 5.51),
("were,", 0, 6.54, 6.55),
("just", 0, 8.51, 8.52),
("going", 0, 9.3. 10.61),
("to", 0, 12.81, 12.84),
("now", 0, 13.01, 13.52),
("on", 0, 13.53, 13.91),
("the,", 0, 14.54, 14.85),
("beach.", 0, 15.11, 15.52),
("Um", 0, 16.53, 16.91),
("are?", 0, 18.54, 18.85),
("You", 0, 19.51, 19.92),
("is", 0, 20.31. 20.61),
("this?", 0, 21.81, 21.84),
("are", 0, 22.51, 22.82),
("you", 0, 23.53, 23.61),
("okay,", 0, 23.94, 24.55),
("with", 0, 24.91,25.52)
(that?", 1, 25.93, 26.51),
("You", 1, 28.54, 28.95),
("already", 1, 29.51, 30.12),
("sold", 1, 30.31. 30.81),
("this?", 1, 31.87, 32.04)
]
REV.AI JSON:
[
("Um,", 0, 0.00, 0.12),
("I", 1, 0.93, 1.02),
("told", 1, 1.22, 1.41),
("my", 1, 1.54. 1.93),
("parents", 0, 2.02, 2.44),
("that", 0, 2.51, 2.62),
("they", 0, 3.65, 3.71),
("could", 0, 3.74, 3.96),
("stay", 0, 4.01, 4.12),
("in", 0, 4.23, 4.25),
("our", 0, 4.33, 4.38),
("room", 0, 4.44, 4.49),
("um", 1, 4.53, 4.57),
("this", 1, 4.62, 4.69),
("weekend", 1, 4.71, 5.22),
("So", 0, 5.33, 5.51),
("we're,", 0, 6.44, 6.57),
("just", 0, 8.41, 8.42),
("going", 0, 9.32. 10.66),
("to", 0, 12.81, 12.84),
("go", 0, 13.03, 13.55),
("on", 0, 13.51, 13.93),
("the", 0, 14.44, 14.75),
("couch.", 0, 15.21, 15.42),
("Um,", 1, 16.54, 16.91),
("are", 1, 18.58, 18.75),
("you,", 0, 19.52, 19.93),
("is", 0, 20.31. 20.61),
("that,", 0, 21.82, 21.87),
("are", 0, 22.41, 22.62),
("you", 0, 23.33, 23.71),
("okay,", 0, 23.94, 24.65),
("with", 1, 24.91,25.52)
(that?", 1, 25.93, 26.51),
("You", 1, 28.53, 28.96),
("already", 1, 29.31, 30.22),
("told", 1, 30.37. 30.83),
("them.", 0, 31.82, 32.14)
]

Merged Transcript:
[
("Um,", 0, 0.00, 0.11),
("I", 0, 0.92, 1.05),
("told", 0, 1.21, 1.42),
("my", 0, 1.53. 1.91),
("parents", 0, 2.01, 2.44),
("that", 0, 2.51, 2.62),
("they", 0, 3.63, 3.71),
("could", 0, 3.74, 3.95),
("stay", 0, 4.01, 4.12),
("in", 0, 4.23, 4.25),
("our", 0, 4.34, 4.38),
("room", 0, 4.41, 4.49),
("on,", 0, 4.53, 4.59),
("this", 0, 4.64, 4.69),
("weekend", 0, 4.71, 5.22),
("So", 0, 5.33, 5.51),
("were,", 0, 6.54, 6.55),
("just", 0, 8.51, 8.52),
("going", 0, 9.3. 10.61),
("to", 0, 12.81, 12.84),
("now", 0, 13.01, 13.52),
("on", 0, 13.53, 13.91),
("the,", 0, 14.54, 14.85),
("beach.", 0, 15.11, 15.52),
("Um", 0, 16.53, 16.91),
("are?", 0, 18.54, 18.85),
("You", 0, 19.51, 19.92),
("is", 0, 20.31. 20.61),
("this?", 0, 21.81, 21.84),
("are", 0, 22.51, 22.82),
("you", 0, 23.53, 23.61),
("okay,", 0, 23.94, 24.55),
("with", 0, 24.91,25.52)
(that?", 1, 25.93, 26.51),
("You", 1, 28.54, 28.95),
("already", 1, 29.51, 30.12),
("sold", 1, 30.31. 30.81),
("this?", 1, 31.87, 32.04)
]

Next, all of the words in the word level transcript are flattened and joined to create one continuous, single whitespace-separated string: As an illustration, we will consider the string below as an example of a flattened and joined word level transcript:

"Um, I told my parents that they could stay in our room on this weekend. So we're just going to go on the couch. Um, are you, is that, are you okay with that? You already told them."

Next, as a first pass, this string is converted into ULACs using lexical dependency grouping. This step is conducted using the python NLP library Spacy. Essentially, a dependency tree is created from of all the words in the transcript, regardless of speaker label/punctuation. A dependency tree is basically a probability of how much certain words associate with other adjacent words. This method is superior to splitting text via punctuation because, in certain cases, especially with commas, a punctuation mark can represent a change in utterance topic, or simply a rhythmic step. For example:

SPLIT BY LEXICAL DEPENDENCY GROUP
[
0:
("Um,", 0, 0.00, 0.11),
("I", 0, 0.92, 1.05),
("told", 0, 1.21, 1.42),

```
("my", 0, 1.53. 1.91),
("parents", 0, 2.01, 2.44),
("that", 0, 2.51, 2.62),
("they", 0, 3.63, 3.71),
("could", 0, 3.74, 3.95),
("stay", 0, 4.01, 4.12),
("in", 0, 4.23, 4.25),
("our", 0, 4.34, 4.38),
("room", 0, 4.41, 4.49),
("on,", 0, 4.53, 4.59),
("this", 0, 4.64, 4.69),
("weekend", 0, 4.71, 5.22),
1:
("So", 0, 5.33, 5.51),
("we're,", 0, 6.54, 6.55),
("just", 0, 8.51, 8.52),
("going", 0, 9.3. 10.61),
("to", 0, 12.81, 12.84),
("go", 0, 13.01, 13.52),
("on", 0, 13.53, 13.91),
("the,", 0, 14.54, 14.85),
("couch.", 0, 15.11, 15.52),
2:
("Um,", 0, 16.53, 16.91),
("are", 0, 18.54, 18.85),
("you,", 0, 19.51, 19.92),
("is", 0, 20.31. 20.61),
("that,", 0, 21.81, 21.84),
("are", 0, 22.51, 22.82),
("you", 0, 23.53, 23.61),
("okay,", 0, 23.94, 24.55),
("with", 0, 24.91,25.52),
(that?", 1, 25.93, 26.51),
3:
("You", 1, 28.54, 28.95),
("already", 1, 29.51, 30.12),
("told", 1, 30.31. 30.81),
("them.", 1, 31.87, 32.04)
]
```

In this case, the commas do not represent a change in utterance topic, but do represent a rhythmic, stuttering/stalling component to the speech. It would be misguided to group "Um, are you, is that, are you okay with that?" into punctuation separated groups since all the words connect to the same utterance topic, making our dependency grouping a superior initial splitting method.

Next, to preserve the structure of each LILAC and the overall sequence order of the ULACs, the ULACs are assigned a unique sequential number. The first LILAC is assigned '0', the second LILAC is assigned '1', and so on, incrementing by 1 until each LILAC has been labeled. Then, each word is assigned its LILAC label as an addition piece of metadata:

```
[
("Um,", 0, 0.00, 0.11, 0),
("I", 0, 0.92, 1.05, 0),
("told", 0, 1.21, 1.42, 0),
("my", 0, 1.53. 1.91, 0),
("parents", 0, 2.01, 2.44, 0),
("that", 0, 2.51, 2.62, 0),
("they", 0, 3.63, 3.71, 0),
("could", 0, 3.74, 3.95, 0),
("stay", 0, 4.01, 4.12, 0),
("in", 0, 4.23, 4.25, 0),
("our", 0, 4.34, 4.38, 0),
("room", 0, 4.41, 4.49, 0),
("on,", 0, 4.53, 4.59, 0),
("this", 0, 4.64, 4.69, 0),
("weekend", 0, 4.71, 5.22, 0),
("So", 0, 4.53, 5.51, 1),
("we're,", 0, 6.54, 6.55, 1),
("just", 0, 8.51, 8.52, 1),
("going", 0, 9.3. 10.61, 1),
("to", 0, 12.81, 12.84, 1),
("go", 0, 13.01, 13.52, 1),
("on", 0, 13.53, 13.91, 1),
("the,", 0, 14.54, 14.85, 1),
("couch.", 0, 15.11, 15.52, 1),
("Um,", 0, 16.53, 16.91, 2),
("are", 0, 18.54, 18.85, 2),
("you,", 0, 19.51, 19.92, 2),
("is", 0, 20.31. 20.61, 2),
("that,", 0, 21.81, 21.84, 2),
("are", 0, 22.51, 22.82, 2),
("you", 0, 23.53, 23.61, 2),
("okay,", 0, 23.94, 24.55, 2),
("with", 0, 24.91,25.52, 2),
(that?", 1, 25.93, 26.51, 2),
("You", 1, 28.54, 28.95, 3),
("already", 1, 29.51, 30.12, 3),
("told", 1, 30.31. 30.81, 3),
("them.", 1, 31.87, 32.04, 3)
]
```

ULACs with their associated metadata are created by aggregating words, grouping by LILAC label. The minimum start time and maximum stop time within the grouping boundaries is used to denote the start and stop timestamps for each new LILAC.

To assign a speaker label to a LILAC, the speaker label that occurs most frequently within a grouping boundaries is selected as the speaker label for the LILAC. This strategy corrects speaker label errors initially made by the speaker diarization method, which is most prone to error during speaker transitions. For example, consider the following:

Partner A: "How's it going?"

Partner B: "I'm okay."

Most often, the speaker diarization method will assign partner A to the words "How's", "it", "going?" and partner B to the words "I'm", "okay." However, as mentioned above, if an error were to occur in the speaker diarization method, it would likely be near the speaker turn transition. For example, the method may falsely assign to partner A the words "How's", "it", and to partner B the words "going?", "I'm", "okay." The currently disclosed LILAC-generation method corrects this problem because the syntactically dependent ULAC-generation method groups the words "How's", "it", "going?", "I'm", "okay." into "How's it going?", "I'm okay." The speaker label for the first LILAC is then accurately assigned by selecting the speaker label assigned to the greatest number of words in the first LILAC, partner A, and the speaker label for the second LILAC is then accurately assigned by selecting the speaker label assigned to the greatest number of words in the second LILAC, partner B.

Processing the example, as discussed above, yields the following result:

```
[
    ("Um, I told my parents that they could stay in our room this weekend.", 0,
0, 4.33, 0),
        ("So we're just going to go on the couch.", 0, 4.53, 15.52, 1),
        ("Um, are you, is that, are you okay with that?", 0, 16.53, 26.51, 2),
        ("You already told them.", 1, 28.54, 32.04, 3),
        ]
```

In rare cases the two different transcription services provide different words. This causes the merge algorithm to produce an utterance with start time for the utterance exceeding the stop time. In order to deal with such cases, the times associated with ULACs are adjusted. To adjust faulty stop times, we take the difference between the start time of the utterance and the next utterance start time. We then compute 90% of that time interval and add it to the current utterance start time. This value is used as the stop time. This approach greatly improves the overall quality of methodically generated transcripts in several ways. First, the majority of ULACs display intra-contextual meaning because the constituent words are lexically dependent. Second, speaker diarization is improved. As previously mentioned, speaker diarization often fails during speaker turn transitions. The described approach solves this problem by aggregating words into coherent ULACs and assigning the most frequently occurring speaker label as the speaker label for the LILAC, thus overwriting tail-end speaker diarization errors. Further improvements address the uncommon scenario of partner sentence completion. For example, a listening partner may intuit the last word of the speaking partner's sentence and say it out loud. The words of both partners are then joined in the same lexical dependency graph, assuming the listening partner's sentence completion made contextual sense. Because the most frequently-occurring speaker diarization label is assigned to the ULAC, the ULAC is assigned to the original speaker, regardless of whether or not the speaker diarization method accurately discriminated between the two speakers. This is an uncommon case.

Modeling Using Natural Language Processing (NLP)

The Universal Language Model Fine-tuning for Text Classification ("ULMFiT") model is used as a first step in the NLP classification task. Since its release, ULMFiT has revolutionized the field of natural language processing by introducing transfer learning. Transfer learning, which has previously dominated the field of computer vision, involves pretraining a model for a certain task often on a large and general dataset, and then using that model on a similar but different task. ULMFiT extends the concept of transfer learning through fine-tuning methods that update parameters within the language model and classifier depending on the task-specific data being used.

Figure 11:
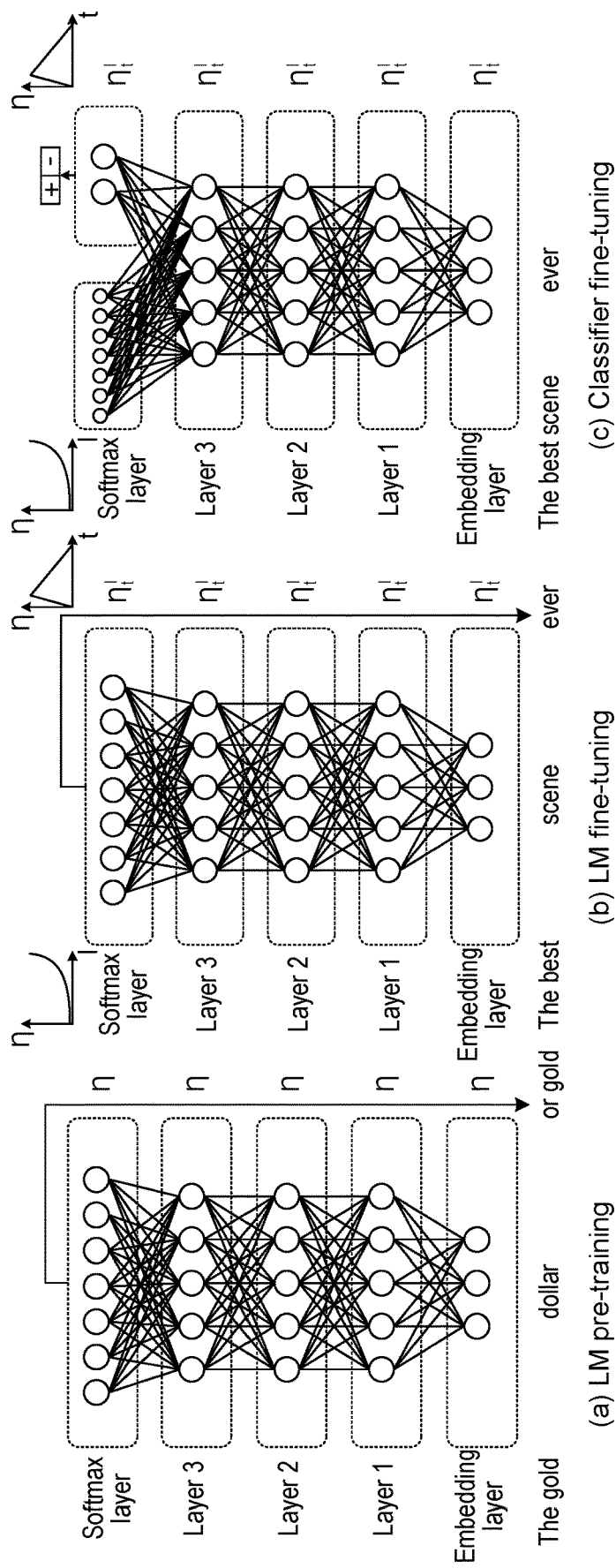
FIG. 11 provides a graphical overview of the ULMFiT process.

On a high level, ULMFiT contains three stages. First, the initial language model, AWD-LSTM, is trained on a very large text dataset. As this stage is computationally expensive and unnecessary to repeat, the original architecture and weights are stored for later use. Second, the language model is fine-tuned on the data being used for the specific task via a variety of parameter-tuning methods. Because the original pre-trained language model already exhibits a rich representation of language, the second step requires little data and processing time. Third, the classifier layer is fine-tuned using similar parameter tuning techniques including gradual freezing, which systematically updates layer weights to maximize task-specific performance without catastrophic loss of general knowledge. FIG. 11 provides a graphical overview of the ULMFiT process.

To prepare data for training, all characters are lowercased. All words are also tokenized according to the mapping supplied by the pretrained model. Stop words are intentionally included due to their relevance to affect codes. Punctuation marks are also retained. To increase the size and scope of the training data, several data-augmentation steps are performed. In computer vision, it is common to rotate, blur, or slightly distort images and add them back into the dataset with the same label as a way to increase the amount of training data without causing any overfitting. A similar practice can be applied to ULACs as long as the distortions make intuitive and logical sense. The distortion of LILACS involves removing punctuation, adding punctuation, switching punctuation, adding relevant stop words, changing pronouns, and other such changes. For example, see the following augmentations:

```
Original:
    "hey, how's it going?"
Augmented:
    "hey how's it going?"
    "hey how is it going?"
    "hey, how's it going."
    "hey, how's this going?"
    ... etc.
Original:
    "no way he didn't say that"
    "no way he did not say that"
    "no way she didn't say that"
    "no way she did not say that"
    "no way they didn't say that"
    ... etc.
```

By this process, size of the training dataset was significantly increased, rendering it robust to the many possible minute changes in LILAC expressions.

ULMFiT is implemented as follows. First, the AWD-LSTM pretrained text model is loaded. Several iterations of model training are then conducted to experiment with layer freezing and learning-rate updating. Essentially, the model consists of several layers. The layers at the top of the model represent basic, unstructured information and the layers at the bottom represent increasingly abstract concepts. Typically, in transfer learning, all layers except the last layer are frozen. This means that much of the information learned by the model in pretraining can be preserved and channeled into the specific classes defined by the dataset. In the implemented approach, every layer in the model is unfrozen, which is unconventional in transfer learning but more common with smaller datasets. This practice is combined with dynamically learning the optimal learning rate using the fast.ai implementation of Leslie Smith's 1Cycle policy, which incrementally increases the learning rate from the top to the bottom layer. A dropout rate of 0.5 is used to maximally prevent overfitting. Last, an early stopping is used to limit the number of epochs after validation loss no longer decreased, to avoid overfitting.

To further visualize performance as well as collect further training data, a prediction visualization tool is used. The tool accepts an ULAC as user input and returns the ranked-ordered class probability distribution of predictions in a data frame. It also returns an image where the font size of each class label is adjusted to match the relative size of its predicted probability, similar to a word cloud.

As the system disclosed in this document is a learning system, it is continuously improved when it is retrained with more data. To accomplish this task, the visualization tool comes equipped with a menu displaying one check box per class. If a user disagrees with the machine prediction of a ULAC, the user can check the proper class in the menu and submit the entry. The human-assigned class along with the original ULAC are then sent to a remote database. As reliable human users experiment with the visualization tool and submit entries into the database, the models are retrained. The ULACs to be labeled can also be also supplied by the system. In addition, new training data can be efficiently accumulated. By processing new videos through the entire ULAC generation and affect-code prediction pipeline, new transcripts already annotated with affect-code predictions are created, which a reliable human expert can confirm or change. Corrected transcripts can be fed into the model for further retraining.

Contextualizing Affect-Code Probability Estimates

Figure 12A:
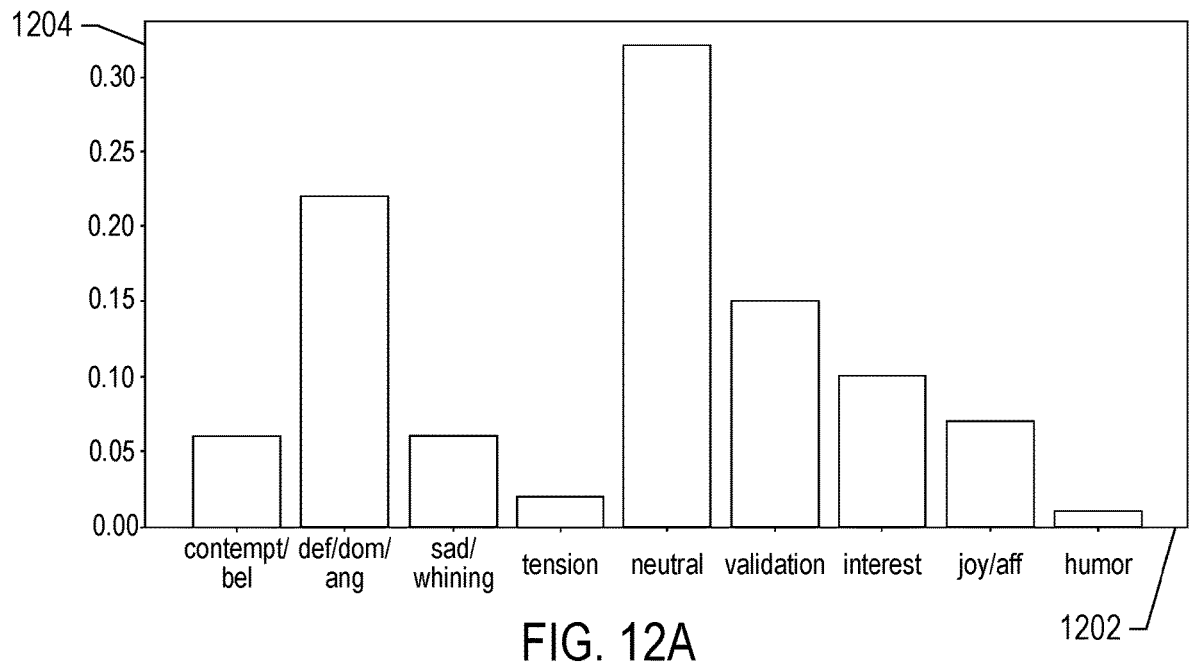
FIGS. 12A-J illustrate the contextualization process for affect-code probability distributions.

FIGS. 12A-J illustrate the contextualization process for affect-code probability distributions. The ULMFiT classification model predicts on standalone utterances. This is potentially problematic as human coders rely upon context. In certain implementations of the currently disclosed methods and systems, context is defined as the relevant historic affect information within a conversation. To logically encode context, an assumption is made that the more negative a conversation has been, the more likely it will be negative in the future, and vice versa. To assign affect codes based on this assumption, a priori and a posteriori information are used. The a priori information is obtained through analyzing the mean distribution of affect-code categories across the entire dataset. This is referred to as the global affect-code distribution which is used later in the contextualization process. FIG. 12A shows an example global affect-code discrete probability distribution ("ACPD"). The horizontal axis 1202 represents affect codes and the vertical axis 1204 represents the probability that a randomly selected ULAC from the data set would be associated with each different affect code.

Figure 12B:
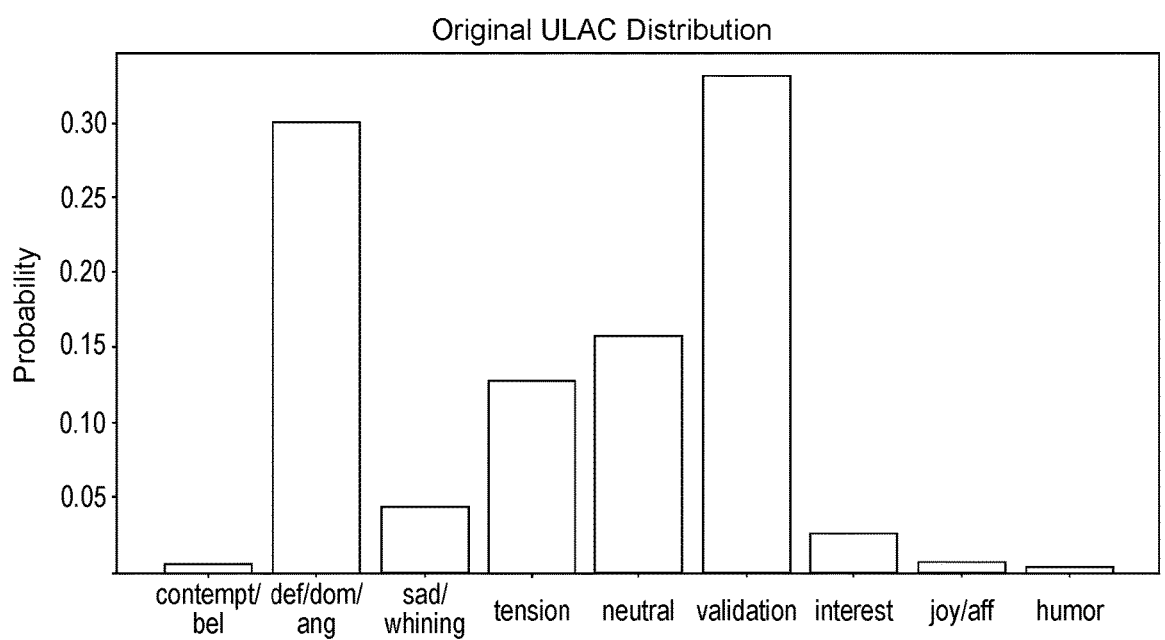

Next, the a posteriori contextual affect information is coded, starting from processed and affect-code-predicted transcript. Contextual affect information is determined from sentiment, which is computed by summing the negative and positive affect-code occurrences into negative and positive sentiment values. This is illustrated, below, for an intermediate, merged ACPD generated for a particular ULAC. The example intermediate, merged ACPD is shown in FIG. 12B.

Figure 12C:
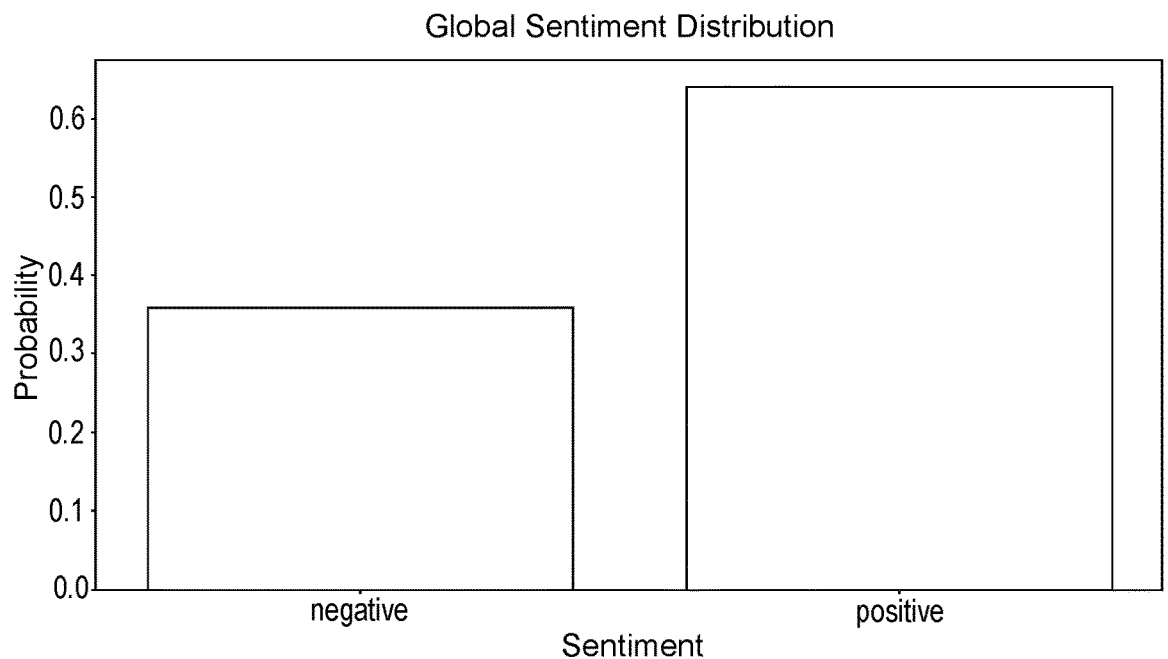
Figure 12D:
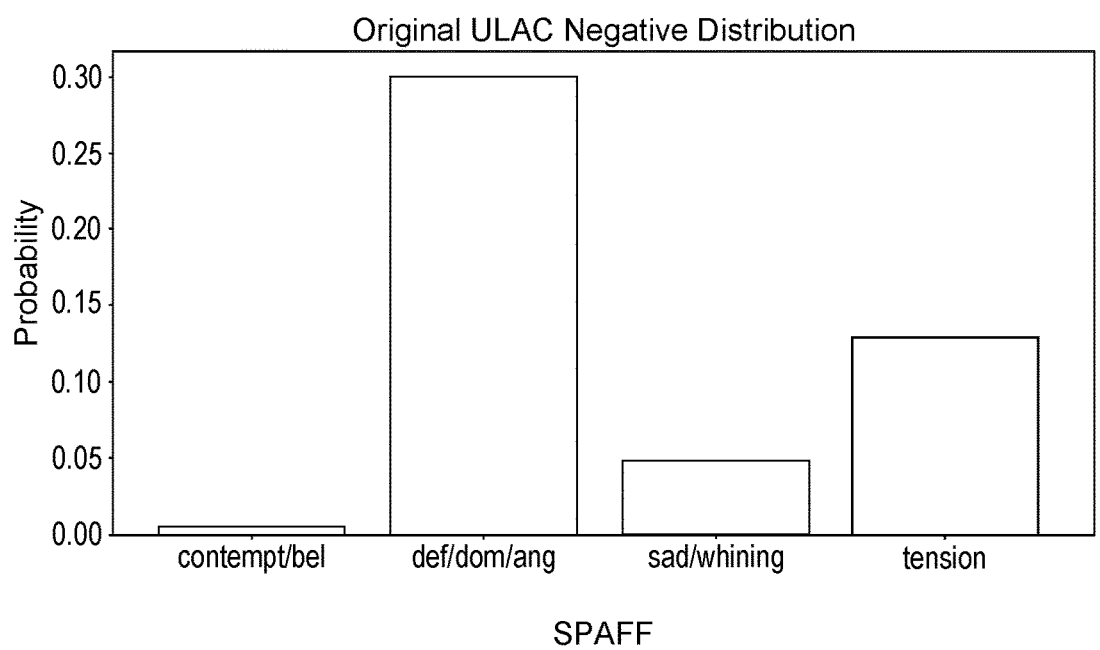
Figure 12E:
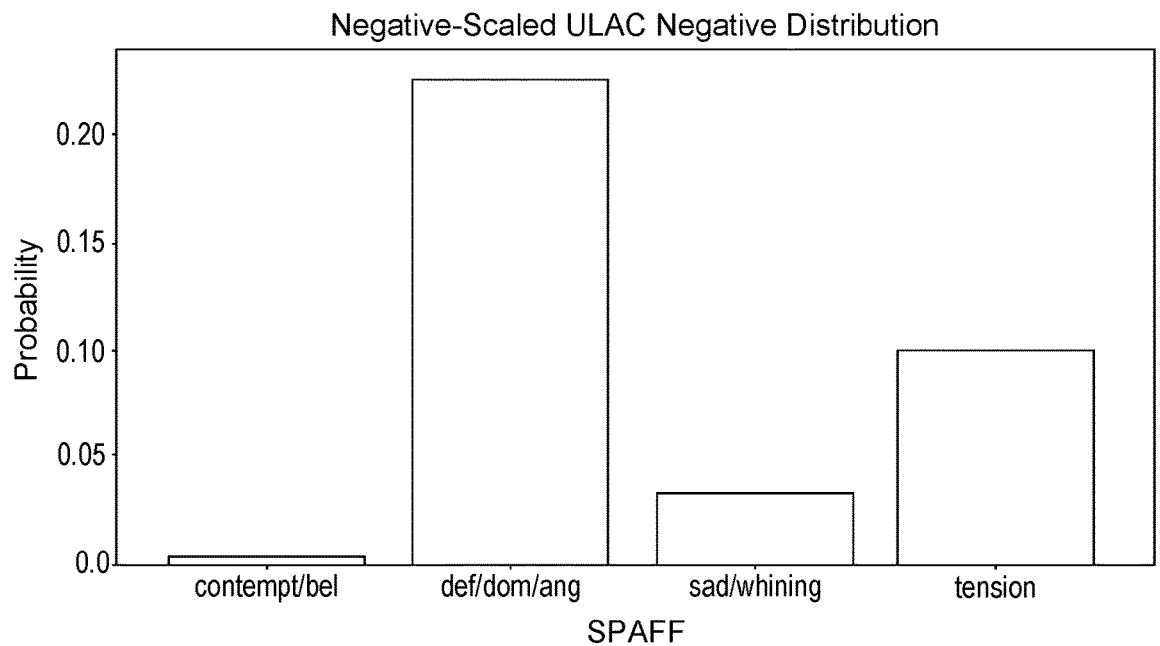
Figure 12F:
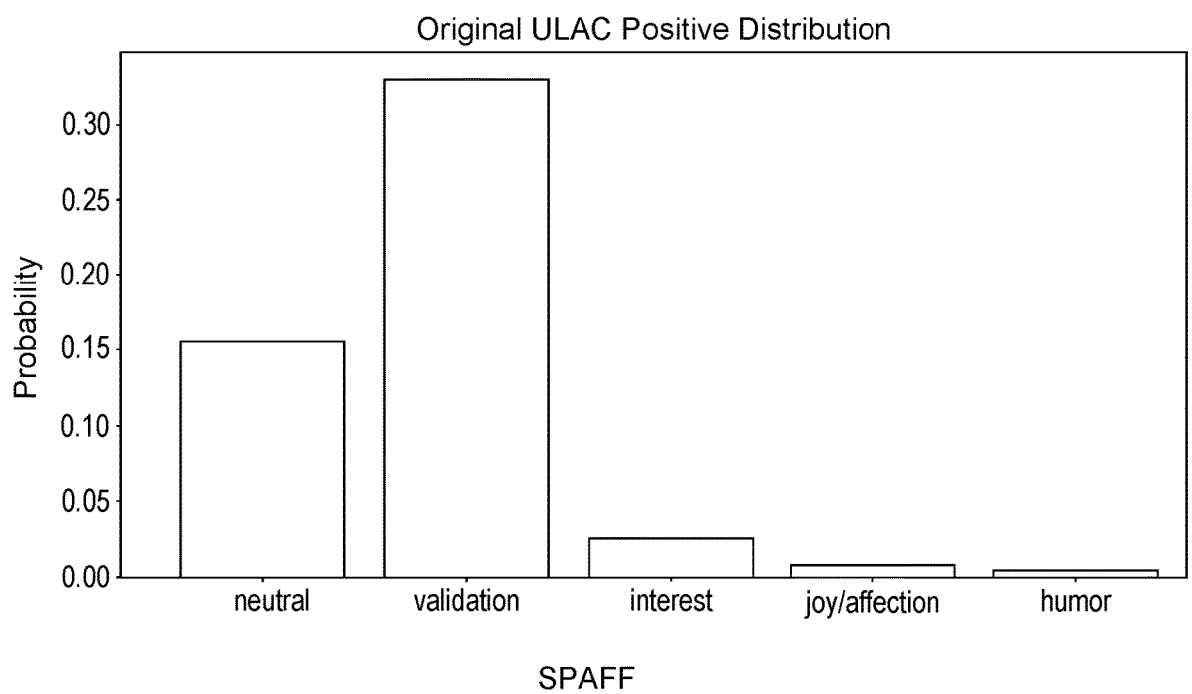
Figure 12G:
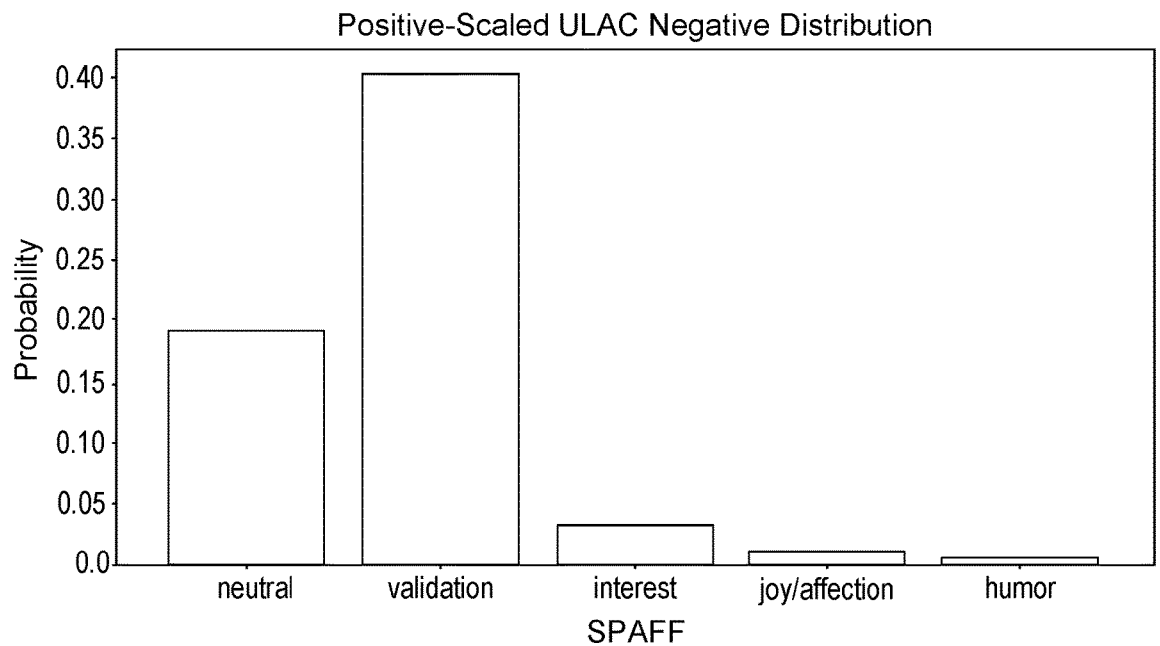

At the start of the process, a sentiment float vector containing the positive and negative affect-code probabilities is computed from the global affect-code distribution. This vector is updated to contain the historic sentiment information of the conversation and the sequence of ULACs generated for the transcript of the conversation. The initial sentiment vector, represented as a two-category histogram, is shown in FIG. 12C. For the first ULAC in the conversation, the global sentiment distribution is used to contextualize the original ULAC affect-code distribution. The distribution and sum of the negative affect codes is extracted from the result APCD associated with the first ULAC. The sum of the probabilities for the negative affect codes is 0.29, and the negative-affect-code distribution is shown in FIG. 12D. Then, the negative affect-code sum (0.29) is divided by the negative global sentiment value (0.36) to compute a coefficient for scaling negative affect-code class probabilities so that their sum matches the negative global sentiment sum. Next, the negative affect-code sum (0.29) is divided by the negative global sentiment value (0.36) to compute a coefficient for scaling negative affect-code class probabilities so that their sum matches the negative global sentiment sum. Each negative affect-code class probability is then divided by this coefficient. This preserves the inter-sentiment distribution of the original prediction, but transforms the intra-sentiment distribution to match the global sentiment distribution. In other words, the ratio between negative class probabilities is the same as in the original distribution, but their sum is now that of the negative global affect-code sentiment sum. This is shown in FIG. 12E. Similar steps are repeated for the positive categories. FIG. 12F shows the original positive affect-code distribution and FIG. 12G shows the positive-scaled affect-code distribution.

Figure 12H:
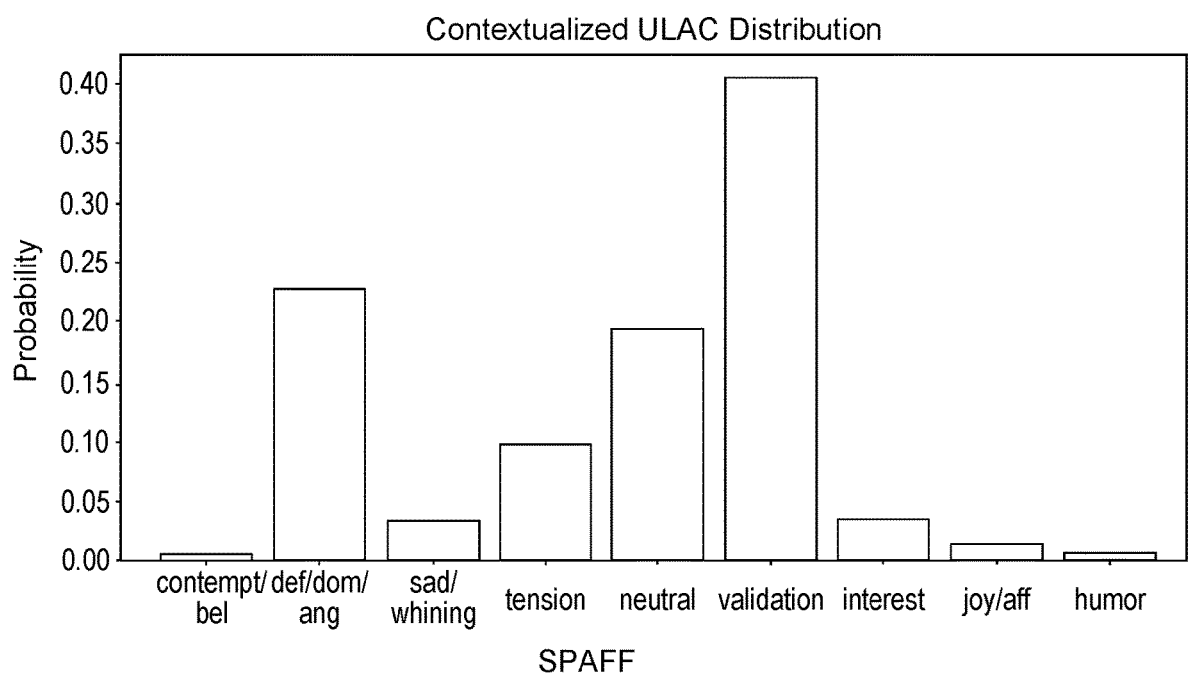
Figure 12I:
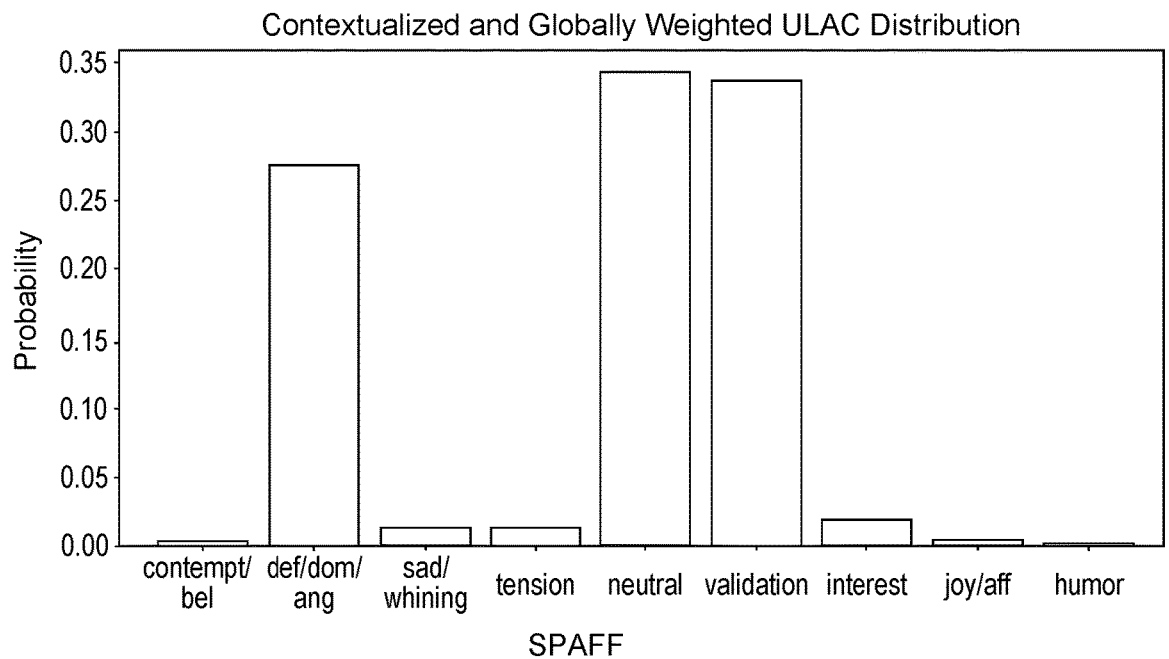
Figure 12J:
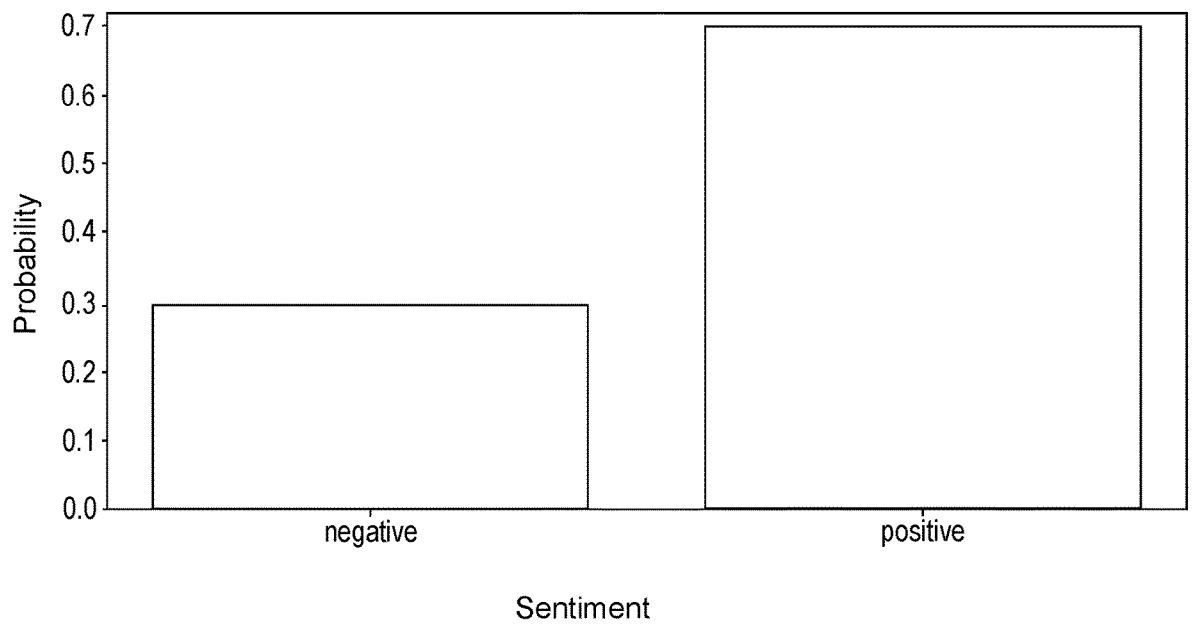

The negative and positive scaled distributions are combined to form a new, contextualized affect-code distribution, as shown in FIG. 12H. Finally, the contextualized affect-code distribution is multiplied by the global affect-code distribution, element by element. The weighted distribution is then normalized. The results are shown in FIG. 12I. After contextualizing and weighting the first LILAC affect-code distribution, the historic sentiment vector is updated to quantify the sentiment observed in the specific conversation at hand. The contextualized affect-code probability distribution is split and summed into positive and negative distributions. This produces a current sentiment distribution, as shown in FIG. 12J. The current sentiment distribution is then used to update the historic vector. To balance the incorporation of new sentiment information while providing stability to the historic sentiment, the historic sentiment is more heavily weighted than the new sentiment information. The updated historic sentiment distribution is then used to contextualize the next LILAC. This process iterates through all ULACs in the conversation.

Audio Processing

The speech (voice) signal consists of several components, related to the language, speaker-specific physiological characteristics of speech production organs, and the emotional status of the speaker. While the linguistic/verbal content of the dialog provides important information for affect-code classification, the acoustic properties, such as voice tone and style, can be useful indicators of displayed affect in speech. Thus, speech emotion recognition is considered as a part of a multimodal model that includes text processing facial expressions extraction from the video signal, and physiological data analysis.

Many existing approaches for extracting the emotional component of speech focus on computing as many acoustic parameters as possible and examine their correlation with emotional categories. Typical parameters include spectral/cepstral coefficients that allow efficient representation of speech signals. However, these parameters, alone, may fail to represent important speaker information. For example, mel-frequency cepstral coefficients ("MFCC") contain mainly information about words spoken, which can be used for speech recognition, but which are not helpful for emotion recognition.

To identify features, most relevant for affect-code determination, classification-trees methods, such as XGBoost, are trained on a small set of affects, such as happy, angry, sad, neutral. Then, deep neural networks ("DNNs") are employed, using a larger number of affects. Conventional long short-term memory ("LSTM") recurrent neural networks, applied to audio time-series data, typically do not achieve higher than 60% accuracy and are inefficient with training. Therefore, time-series data is converted to images and convolutional neural network (CNN) models for image classification are instead applied in the disclosed methods and systems. In the simplest case, a spectrogram appears to be a natural 2D representation, or image, of a 1D sound time series. In general, a time series can be converted to an image using any of various transformations, such as the Gramian-angular-difference-field transformation ("GADF").

In addition to low-level acoustic features, higher level prosodic characteristics are also employed. These parameters allow for better characterization of speech intonation, rhythm, and stress. Humans typically use prosodic information to distinguish word/sentence boundaries, speaker, language, and emotional characteristics. Prosodic cues are quantified by pitch, energy, and duration as measurable acoustic parameters. Parselmouth is used to call Praat functions from Python to evaluate different acoustics, as well as Librosa to compute low-level features. Since all audio files need to have the same sampling rate, they are converted to a 16 kHz, 32-bit sampling rate using Sound eXchange ("SoX"). The parameters are evaluated for each ULAC, with further possible segmentations obtained from speech transcripts. In addition, corresponding statistics for each feature, such as the mean, standard deviation, and others, are also computed at ULAC level.

Pitch and Intonation Contours

As a physical parameter, pitch $F_0$ is the fundamental frequency of vibration of the vocal cords. For males, it is typically between 80 and 200 Hz and, for females, between 180 and 400 Hz during conversational speech. Intonation is defined as a variation of pitch during a time interval represented by a ULAC. When directly computed, fundamental-frequency contours contain much redundant information from the listener's perception perspective. Therefore, pitch stylization is evaluated as a linear approximation of the original pitch contour.

$F_0$ Mean, Peak, and Delta Pitch

Delta pitch is defined as the difference between minimum and maximum pitch values per single ULAC.

Speech Rate

Speech rate is defined as a number of spoken syllables per second per ULAC duration. It is not quite representative for short ULACs. An average rate can be used, instead, in such cases. This feature is normalized to be speaker-specific and with respect to other durational features.

Short Time Energy

Short time energy is the energy calculated using a windowed short-time Fourier transform ("STFT").

Jitter

Jitter is defined as an average absolute difference of fundamental frequency between consecutive periods.

Shimmer

Shimmer is a measure of period-to-period variability of the amplitude value of consecutive periods divided by the average amplitude.

Maximal and Average Pause Duration

These pause-duration parameters are not ULAC-level parameters, but can be important features for identification of certain affect-code categories, such as sadness and stonewalling.

Spectral Features

Spectral features are obtained by classification of spectrograms as low-resolution 2D images using CNNs. Considering an audio signal as a multi-variable time series, a shapelets approach is used to discover anomalies.

Visual Data Processing

The following steps are performed in order to estimate affect-code categories from video frame data. Timestamps for each utterance are used to create an image sequence of each utterance from the partner-split video. To mitigate transitional speaker artifacts, the first and last 10% of each image sequence is trimmed. As most modeling techniques require uniform input data, all image sequences are trimmed to 180 images (6 seconds*30 FPS). A period of 6 seconds is selected because 75% of the utterances in the dataset that is used have durations of under 6 seconds. Image sequences that are shorter than 6 seconds are padded with zeros at the end of the image sequence. Multiple features are then created to numerically represent the audio files. These include a host of hand-crafted features, such as facial landmarks, action units, posture vectors, etc., as well as convolutional neural network tensors. Such features are then used to train traditional and deep learning multiclass models. The trained models are then used to predict new utterance-based image sequences. An ACPD is output for input to an ensemble model.

Facial Landmarks

Facial landmarks are a 68-point coordinate system that maps onto the moving parts of a face. Facial landmarks are extracted from video as a 68-tuple vector. Facial emotion classification with facial landmarks using machine learning and deep learning has proved successful in many image-processing applications related to face recognition. As a result, affect-code classification using global facial landmarks is an effective way to augment other visual, audio and text-based methods. The changes in the landmark positions during a conversation have proved particularly useful.

Eye Gaze Direction and Head Position

Eye-gaze direction is a vector representation of the direction of gaze for each eye. Head position is a measure of distance from camera in millimeters. Both are extracted from video as 3-tuple vectors. In addition to facial action units ("AUs") and facial landmarks, eye-gaze direction and head position provide important information that is used for affect-code selection. More specifically, certain affect codes are related to distinct eye and head movement patterns. Occurrence of certain patterns, such as eye rolling and up-down nodding, are treated as input into our affect-code model.

Facial Action Units

Currently, the most significant efforts for visual feature generation have been focused on AUs. AUs are extracted from video. For each frame in the video, the program yields the probability of observation for each individual AU as a float value from 0 to 1.

Physiology

Physiology provides important information about physiological states of the interacting participants. For example, when the text processing sub-system assigns high probabilities to tension and neutral affect codes, the physiological data processing sub-system gives preference to tension when heart rate and somatic activity are high relative to baseline or to a prior calm period in the conversation.

Partner-Based Video Cropping

In order to most efficiently process the videos for remote photoplethysmography ("rPPG"), the videos are partitioned horizontally. The resulting two separate videos each contains images of one participant in the conversation and are labeled "left" and "right." Each video is fed into the rPPG pipeline and an orientation label is used as a downstream parameter.

Reading Video as Images

A video-processing application uses the OpenCV library to read video as a sequence of image frames, represented as BGR matrices. This conversion allows for further image processing and manipulation.

Region of Interest Selection

The region of interest ("ROI") is the specific area in the image frame from which the signal is extracted. The ROI must be large enough so that mean pooling eliminates noise and provides a representative signal. The ROI must be small enough that it contains only relevant BGR data for our signal (i.e. skin). The ROI must contain as little non-skin pixels as possible, including hair, glasses, background, etc. If possible, the forehead should be preferred in ROI selection due to its uniformity in the z plane and its low risk of deformation. To select a ROI which satisfies these conditions, a skin-detection-based ROI selection process is used. The significance of this process is that it allows for location of the ideal ROI to track for an individual throughout the duration of the video, providing a signal with the highest signal to noise ratio.

Skin Detection-Based ROI Selection

The following skin detection-based ROI selection process is applied to the first 10 seconds of the video. For each frame, faces are found using OpenCV's DNN Face Detector model. This is a Caffe model which is based on the Single Shot-Multibox Detector ("SSD") and which uses the ResNet-10 architecture as its backbone. Depending on the orientation of the partner supplied previously, e.g. left, right, or center, several fixed ROIs are drawn on the face bounding box. When the partner is in the center a fixed forehead, left cheek, and right cheek ROI are drawn. When the partner is on the left, a forehead and skewed left cheek ROI are drawn. When the partner is on the right, a forehead and a skewed right cheek ROI are drawn. The ROIs are determined as a fixed proportion within the face bounding box.

Skin detection is then performed on the image within the face bounding box. A model is used which searches for pixels within a fixed range in the HSV and YCrCB space. This approach allows skin detection to be based on hue and lightness, rather than color. The selected skin detection model converts BRG image to HSV space, creates a mask, blacking out all pixels not within the set HSV range, converts BRG image to YCrCb space, creates a mask, blacking out all pixels not within the set YCrCb range, combines HSV and YCrCb masks, reduces noise in the mask through morphological erosion, and applies the mask back to the original BGR frame. For each frame, skin detection is performed and percentage of skin pixels within each ROI is computed. These averages are summed at the end of each 10-second period. After the 10-second period, an ROI is selected. When the forehead contains at least 50% skin pixels over the 10-second period, the forehead is selected as the ROI. When the forehead contains less than 50% skin pixels, the cheek ROI with the highest percentage of skin pixels is selected. After the ROI is selected, the selected ROI is used for the duration of the video. Skin detection is not computed on frames after the 10-second window because the variability of skin detection adds excess noise to the signal.

Use of Physiology for Affect-Code Category Estimation

Physiology is useful for estimating the stonewalling affect code probability. The determination of a probability of the stonewalling affect code relies on distinct and unique logic that does not consider text, audio, or image-based modes. Instead, the determination of the probability of stonewalling relies on a threshold beats-per-minute and additional logic. The global BPM mean per partner is computed across the entire conversation. For each LILAC, an empty stonewalling counter variable is initialized per partner. For each ULAC, the mean BPM per partner is computed. When the ULAC BPM mean is +20 BPM greater than the global mean of the corresponding partner, the partner specific stonewalling counter is incremented by 1. When the corresponding partner is silent during the ULAC, the partner specific stonewalling counter is incremented by 1. When the corresponding partner has displaying a period of silence greater than 5 seconds during the ULAC, the partner specific stonewalling counter is incremented by 1. When the stonewalling counter is equal to 3, then the ensembled affect-code prediction is overridden and the ULAC classified as stonewalling. If not, the ensembled affect-code prediction remains.

Multi-Modal Ensemble Model

To best utilize the multiple modes of data, the aggregated model used by the described implementation of the currently disclosed methods and systems is an ensemble of four sub-systems independently constructed to analyze each of four different modes: (1) a visual mode; (2) an audio mode; (3) a text mode; and (4) a physiology mode. The ACDP outputs from these four sub-systems are used as inputs to a machine learning model that is trained on an affect-code labeled dataset to produce a result ADCP.

Flow Diagrams

Figure 13:
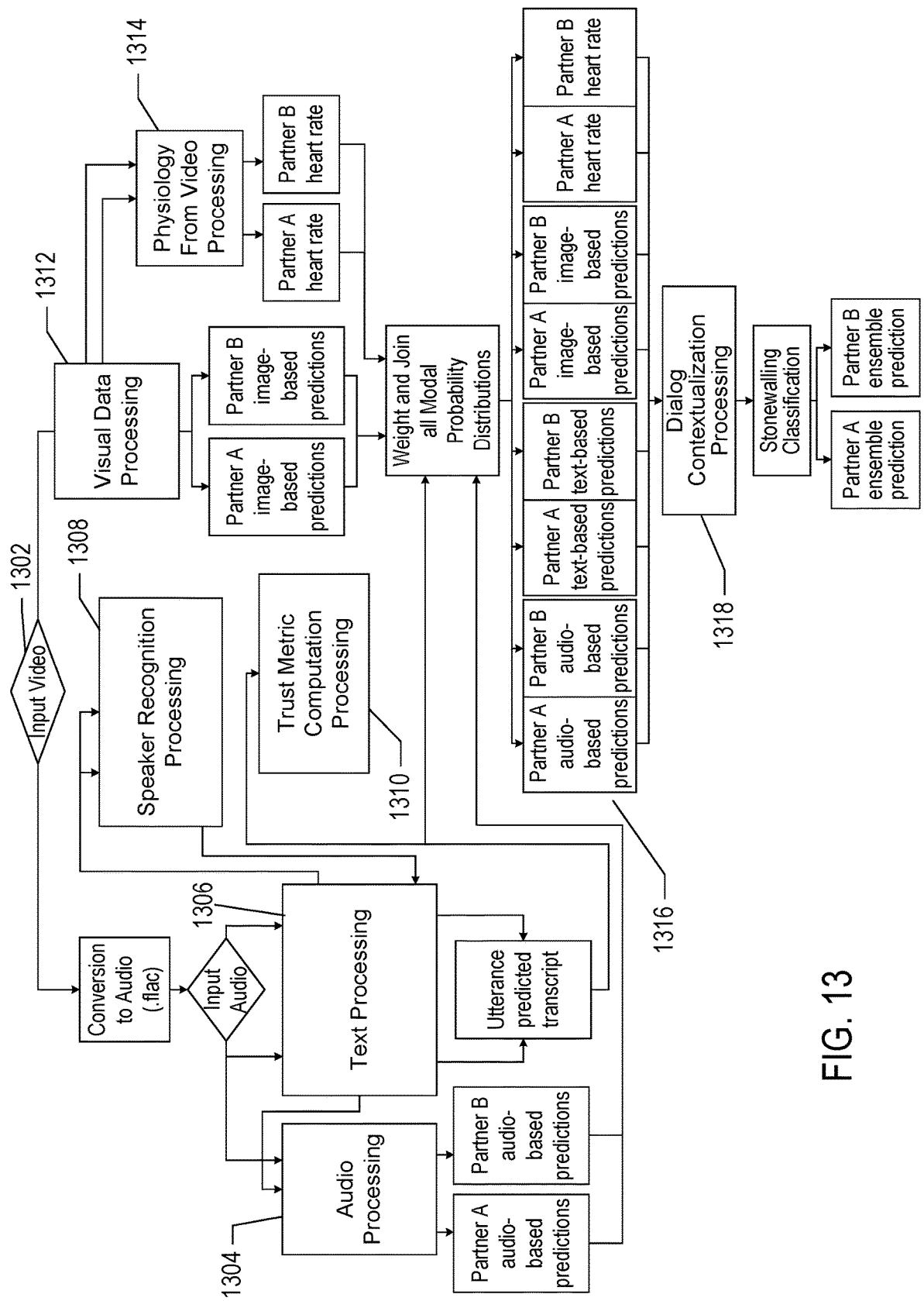
FIGS. 13-20 provide control-flow diagrams that illustrate an implementation of the currently disclosed conversation-processing system that receives a video signal generated by a video camera that records a conversation between two participants and that outputs and affect-annotated-timeline data structure representing the recorded conversation are used by a downstream relationship-counseling system.

FIGS. 13-20 provide control-flow diagrams that illustrate an implementation of the currently disclosed conversation-processing system that receives a video signal generated by a video camera that records a conversation between two participants and that outputs and affect-annotated-timeline data structure representing the recorded conversation are used by a downstream relationship-counseling system. FIG. 13 provides an overview of the implementation of the conversation-processing system. Feature 1302 represent the input video stream. The audio portion of the input video stream is extracted from the video signal and input to an audio-processing module 1304 and a text-processing module 1306. As discussed above, the audio-processing module and the text-processing module executed in parallel. The audio-processing module produces a sequence of output ACDPs. The text-processing module produces a sequence of ACDP-associated ULACs in association with the speaker-recognition-processing module 1308. In this particular implementation, a trust-metric-computation-processing module 1310 generates trust-metric annotations of the ACDP-associated ULACs produced by the text-processing module. A visual-data-processing module 1312 receives the images-portion of the video signal and produces a sequence of ACDPs based on visual information recorded for the conversation participants. Similarly, a physiology-from-video-processing module 1314 receives the images-portion of the video signal and produces a sequence of ACDPs based on extracted physiology information. Thus, the visual-data-processing module 1312 represents the above-mentioned visual mode, the audio-processing module 1304 represents the above-mentioned audio mode, the text-processing module 1306 represents the above-mentioned text mode, and the physiology-from-video-processing module 1314 represents the above-mentioned physiology mode. The ACDPs output by the various modules, or modes, are collected and synchronized and then merged together to produce a sequence of result ACDPs by an intermediate-ACDP-merger component 1316, and the result ACDPs output by the intermediate-ACDP-merger component are input to a dialogue-contextualization-processing module 1318 the modifies the result ACDPs via the sentiment-based contextual-history information, as discussed above, to produce the final result ACDPs which are included in an output affect-annotated-timeline data structure. Note that ULAC identification and text transcription, conducted by the text-processing module, serves as a type of synchronization signal for the remaining processing modules, so that each of the processing modules produces a sequence ACDPs corresponding to the sequence of ULACs identified in the monitored conversation by the text-processing module.

Figure 14:
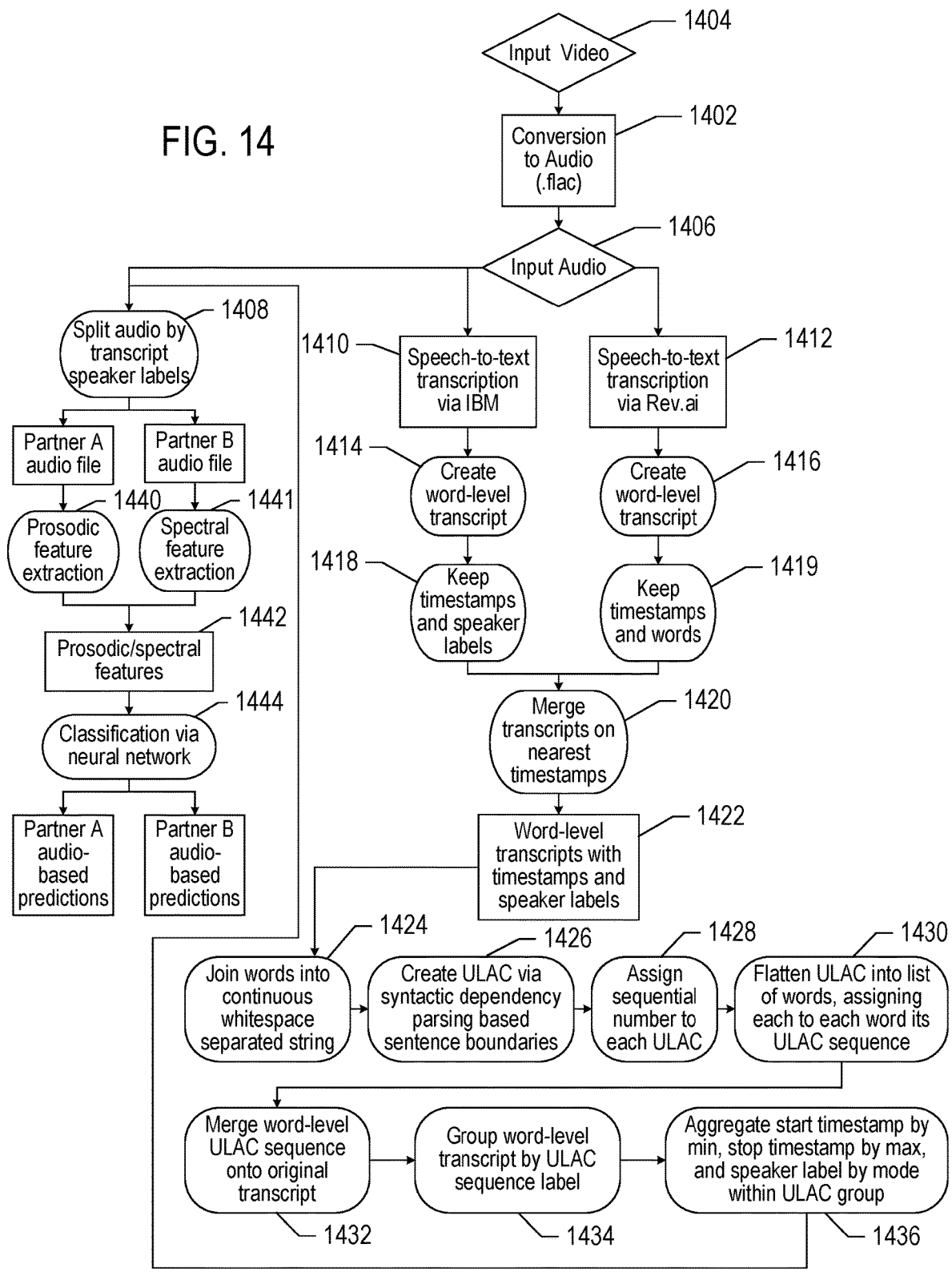

FIG. 14 provides a control-flow diagram illustrating implementation of the audio-processing module 1304 and a portion of the text-processing module 1306 discussed above with reference to FIG. 13. The audio signal is extracted 1402 from the input video signal 1404 to produce an input audio signal 1406. The input audio signal is then routed to a first step 1408 of the audio-processing module and to the first steps of two parallel control flows 1410 and 1412 of the text-processing module 1306. The input audio is transcribed into textual transcripts both by a first speech-to-text service, and step 1410, by a second speech-to-text service, in step 1412. Each produces a textual transcript 1414 and 1416. As discussed above, different portions of the two transcripts are merged together, and steps 1418-1420 to produce a final transcript of the recorded conversation 1422. This transcript is then processed by generating a continuous white space-separated string 1424, creating a sequence of ULACs via syntactic dependency parsing 1426, assigning sequence numbers to each ULAC 1428, generating, for each ULAC, and annotated word list 1430, urging the word list into the original transcript 1432, grouping word-level transcript by ULAC sequence label 1434, and generating a final sequence of ULACs with associated ACDPs representing the conversation 1436. This final sequence of ULACs is input to the first step 1408 of the audio-processing module along with the audio signal. Prosodic feature extraction is then conducted for each participant 1440-1441 to produce prosodic/spectral features 1442 which are input to a neural network 1444 to produce output ACDPs.

Figure 15:
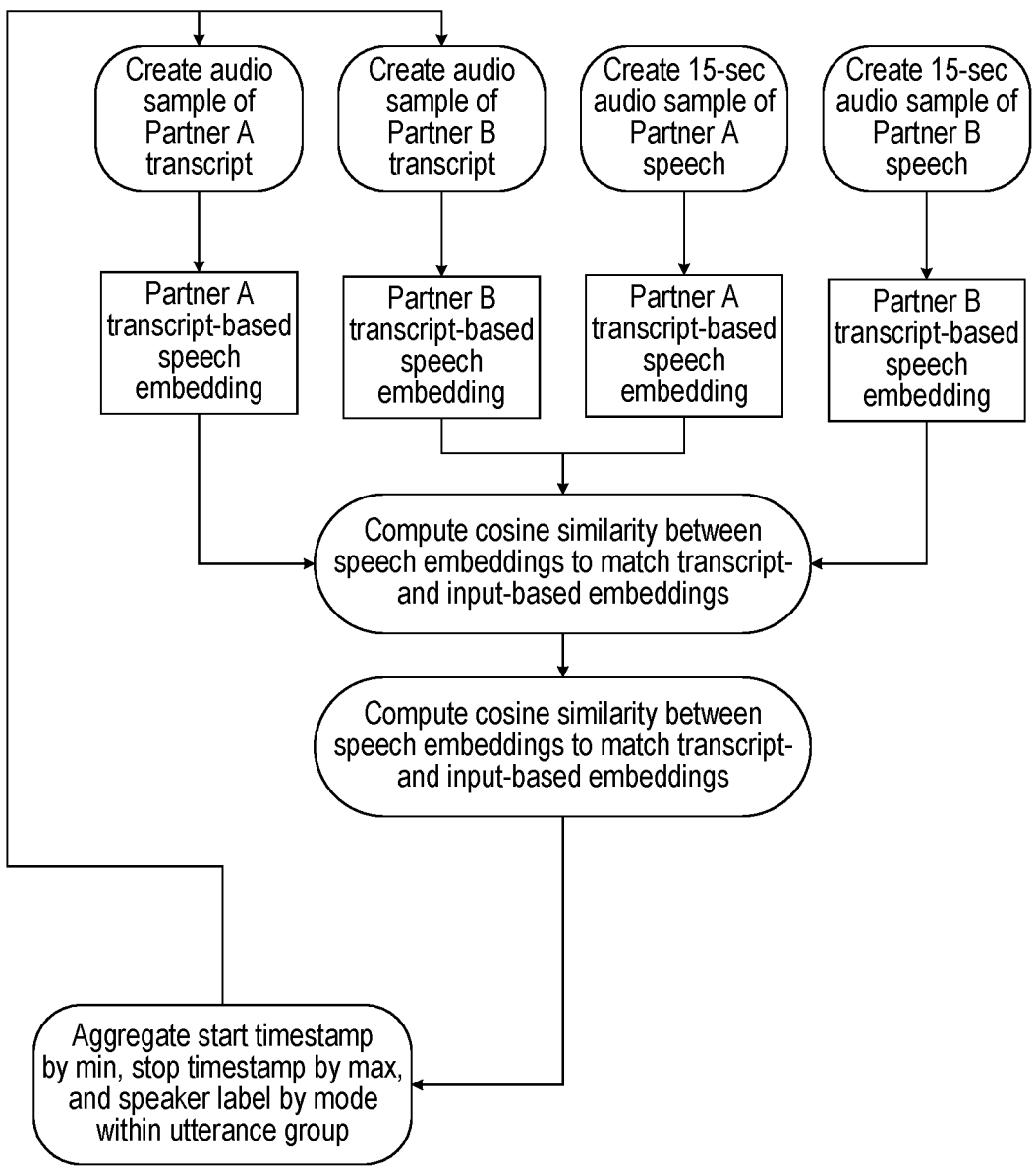
Figure 16:
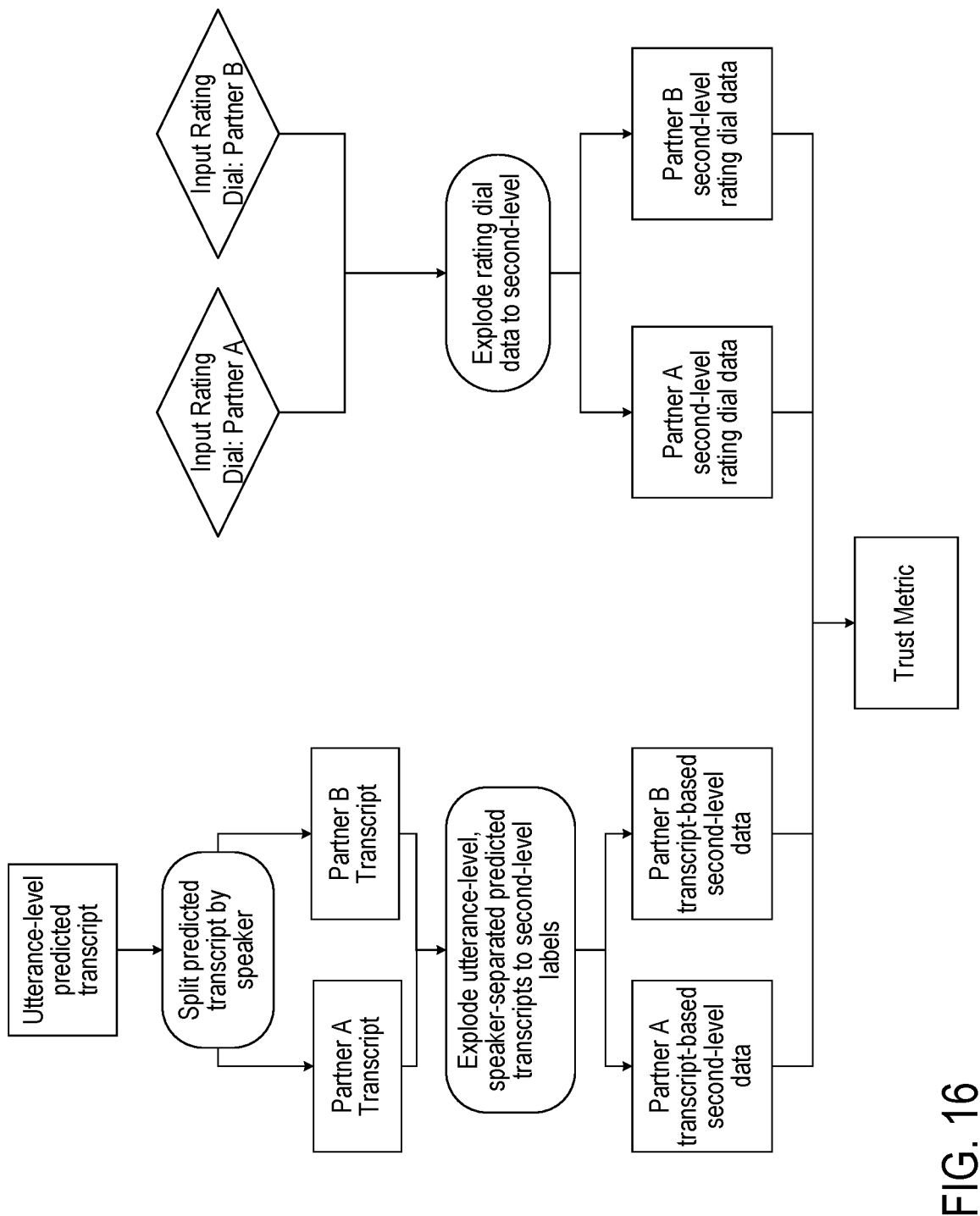

FIG. 15 provides a control-flow diagram that illustrates the speaker-recognition-processing module 1308 discussed above with reference to FIG. 13. The speaker-recognition-processing module uses computed cosine similarities in order to facilitate speaker label and of the ULACs by the text-processing module 1306. FIG. 16 provides a control-flow diagram that illustrates the trust-metric-computation-processing module 1310 discussed above with reference to FIG. 13. The trust metric is an additional annotation particular to relationship counseling and certain other downstream analysis systems.

Figure 17:
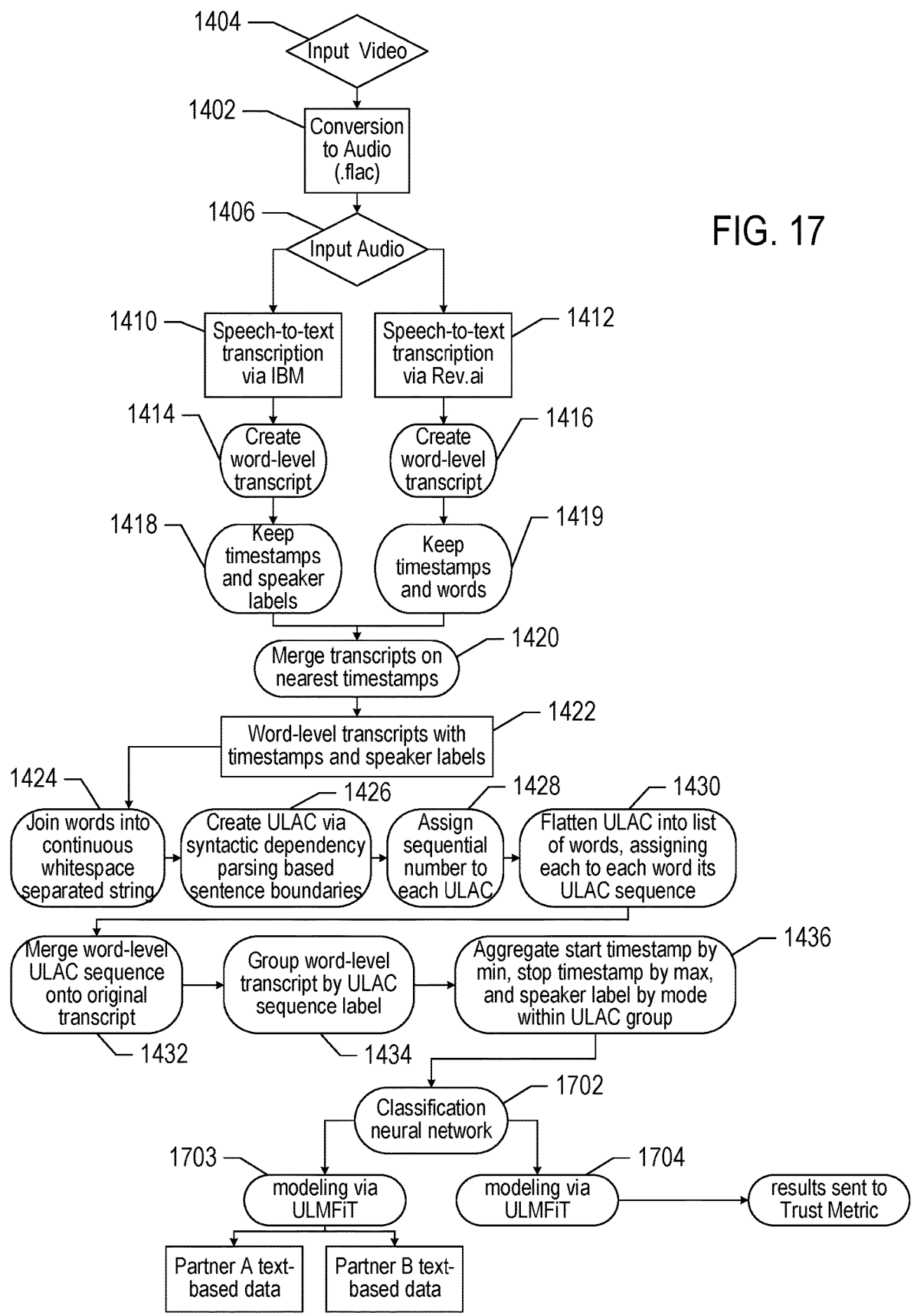

FIG. 17 provides a complete control-flow diagram for the text-processing module 1306 discussed above with reference to FIG. 13. Additional steps 1702-1704 not shown in FIG. 14 involve submitting the sequence of ULACs, produced in step 1436, to the classification neural network and ULMFit modeling in order to produce a final set of output ACDP-associated ULACS.

Figure 18:
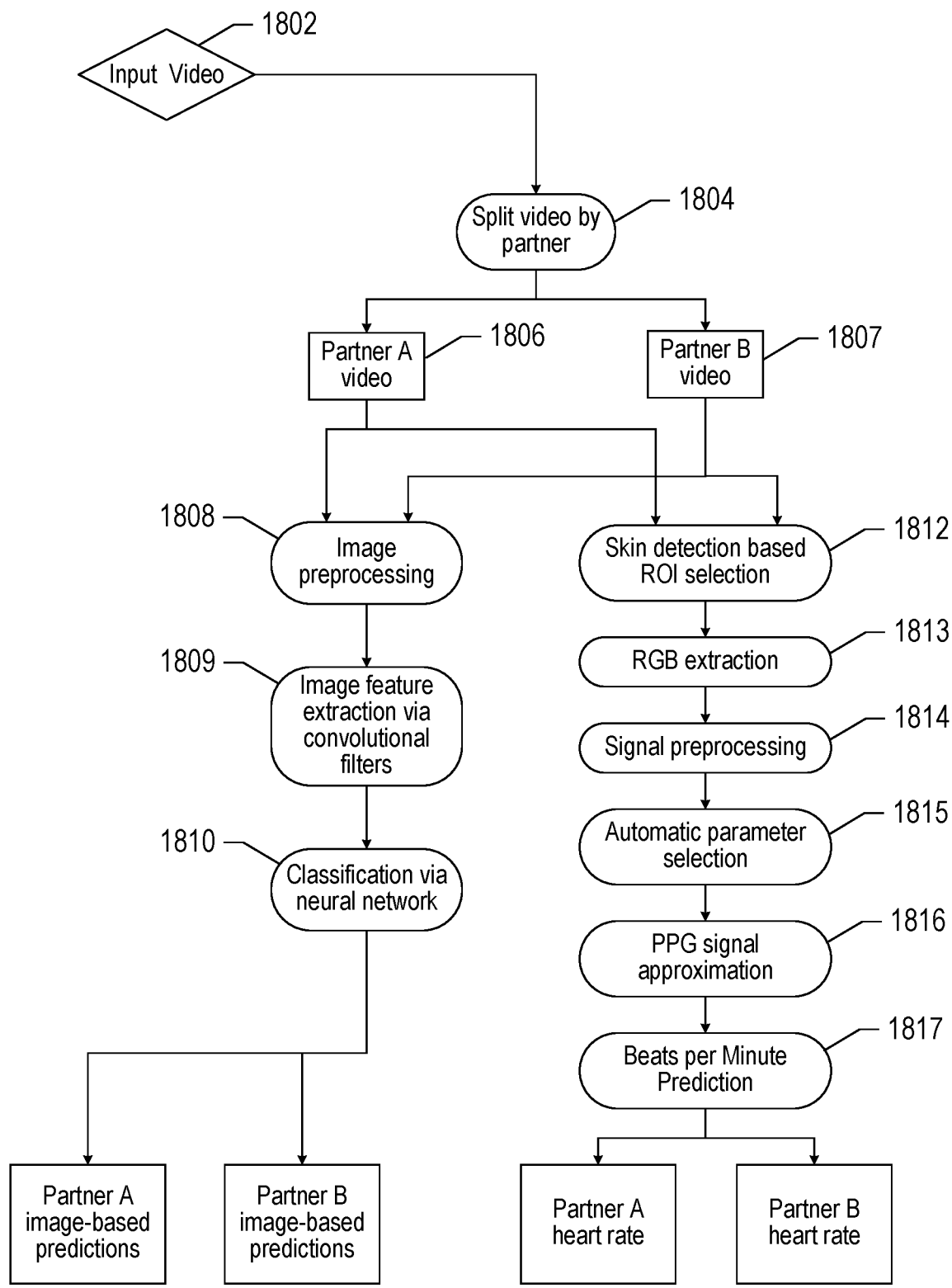

FIG. 18 provides a control-flow diagram that illustrates the visual-data-processing module 1312 and the physiology-from-video-processing module 1314 discussed above with reference to FIG. 13. The input video signal 1802 is split 1804 into two participants video streams 1806-1807. The two participants video streams are processed, in steps 1808-1810 to produce output ACDPs for the visual-data-processing module and are processed in steps 1812-1817 to produce output ACDPs for the physiology-from-video-processing module 1314.

Figure 19:
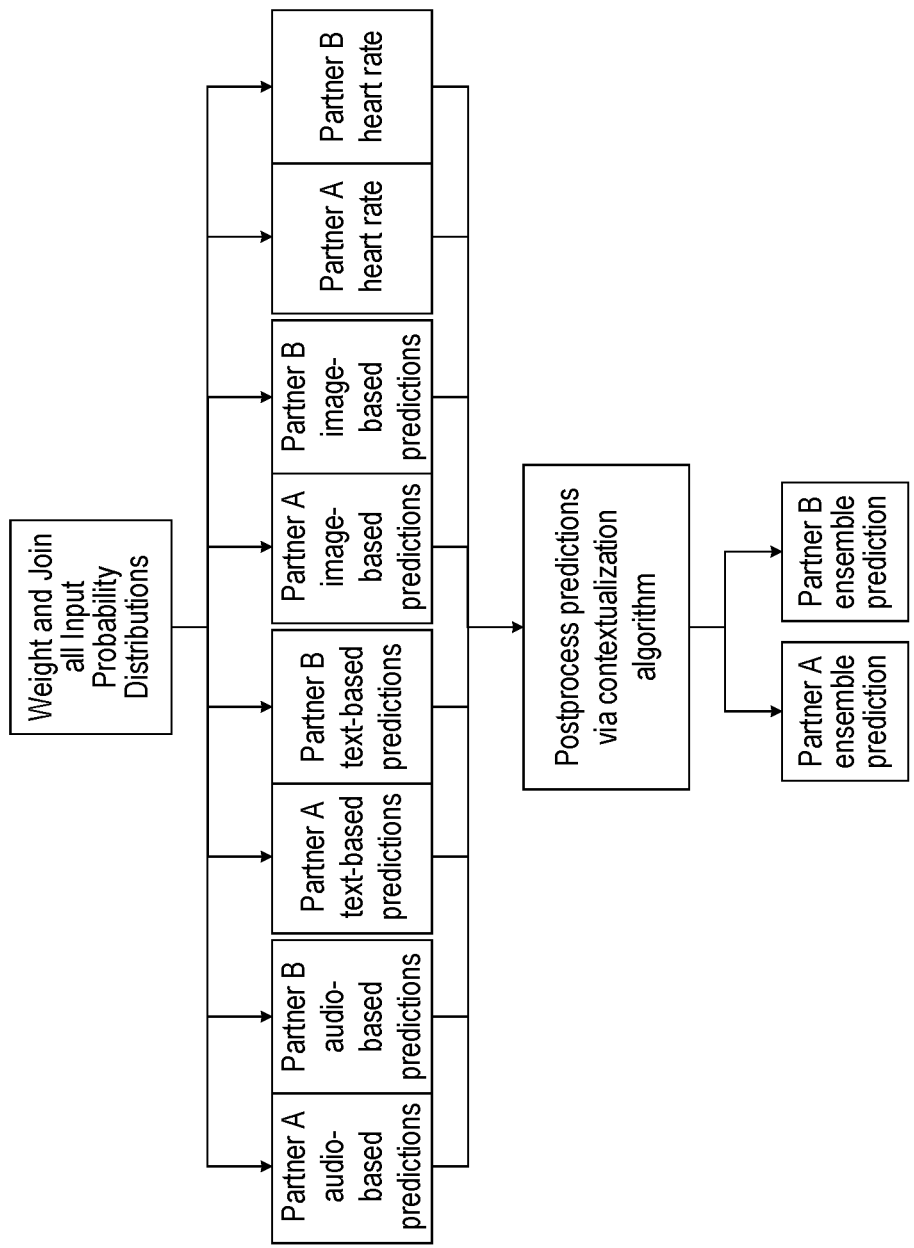
Figure 20:
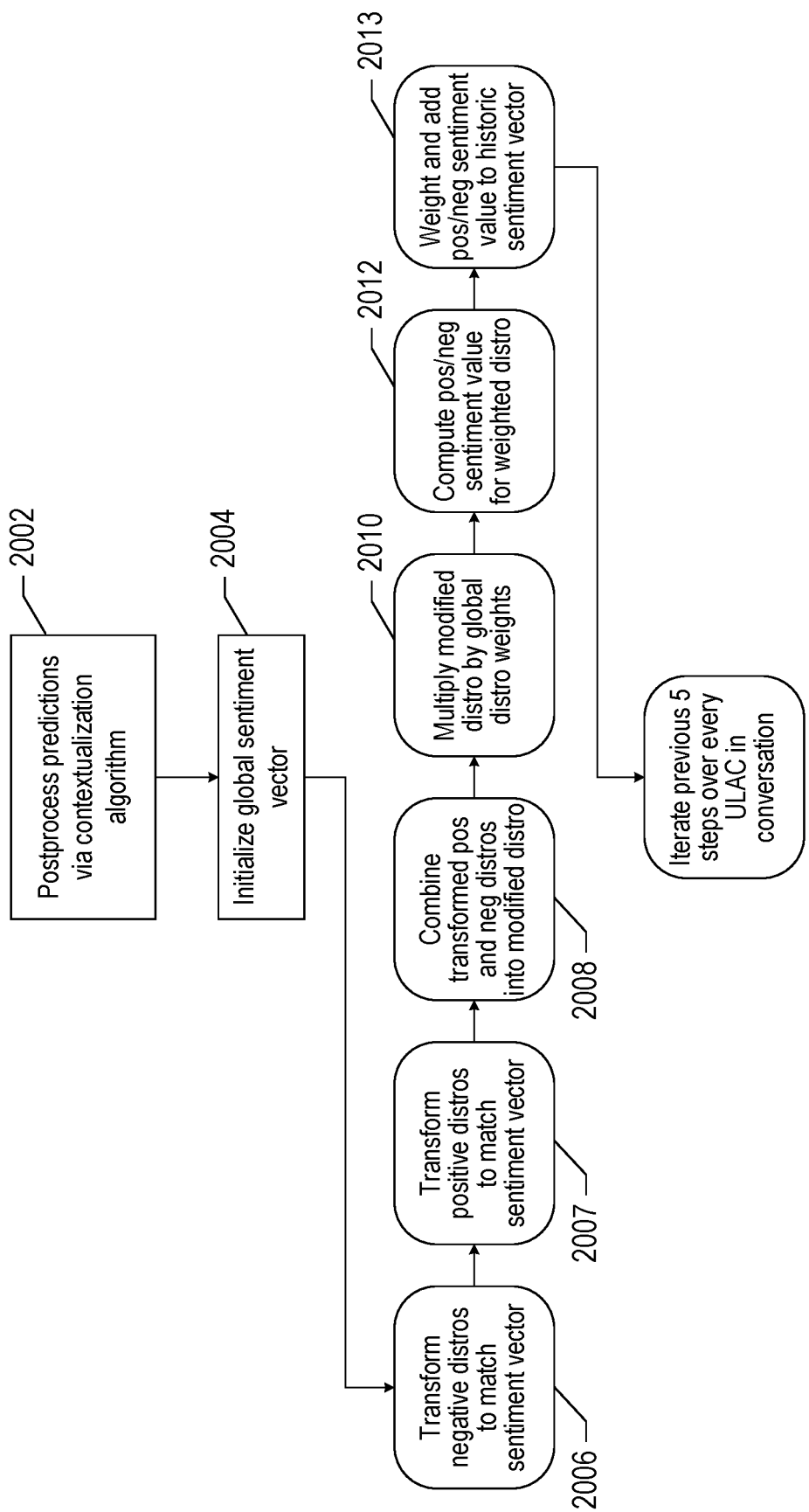

FIG. 19 provides a control-flow diagram for the intermediate-ACDP-merger component 1316. The intermediate-ACDP-merger component generates, for each set of four related ACDPs obtained from the four different modes, or modules, a final ACDP, based on a weighted combination of the four related intermediate ACDPs. FIG. 20 provides a control-flow diagram that illustrates the dialogue-contextualization-processing module 1380 discussed above with reference to FIG. 13. This module receives 2002 the sequence of final ACDPs from the intermediate-ACDP-merger component 1316. In step 2004, a global sentiment vector, or histogram, is initialized. In step 2006, for each final ACDP, the negative-affect-code probability distribution and the positive-affect-code probability distribution are scaled according to the global sentiment vector or histogram, and steps 2006-2007. These scaled distributions are combined in step 2008 and then multiplied by global distribution weights in step 2010 in steps 2012-2013, the historic sentiment vector, or distribution, is updated using the modified ACDP produced in step 2008.

Conversation-Processing Monitor

Figure 21:
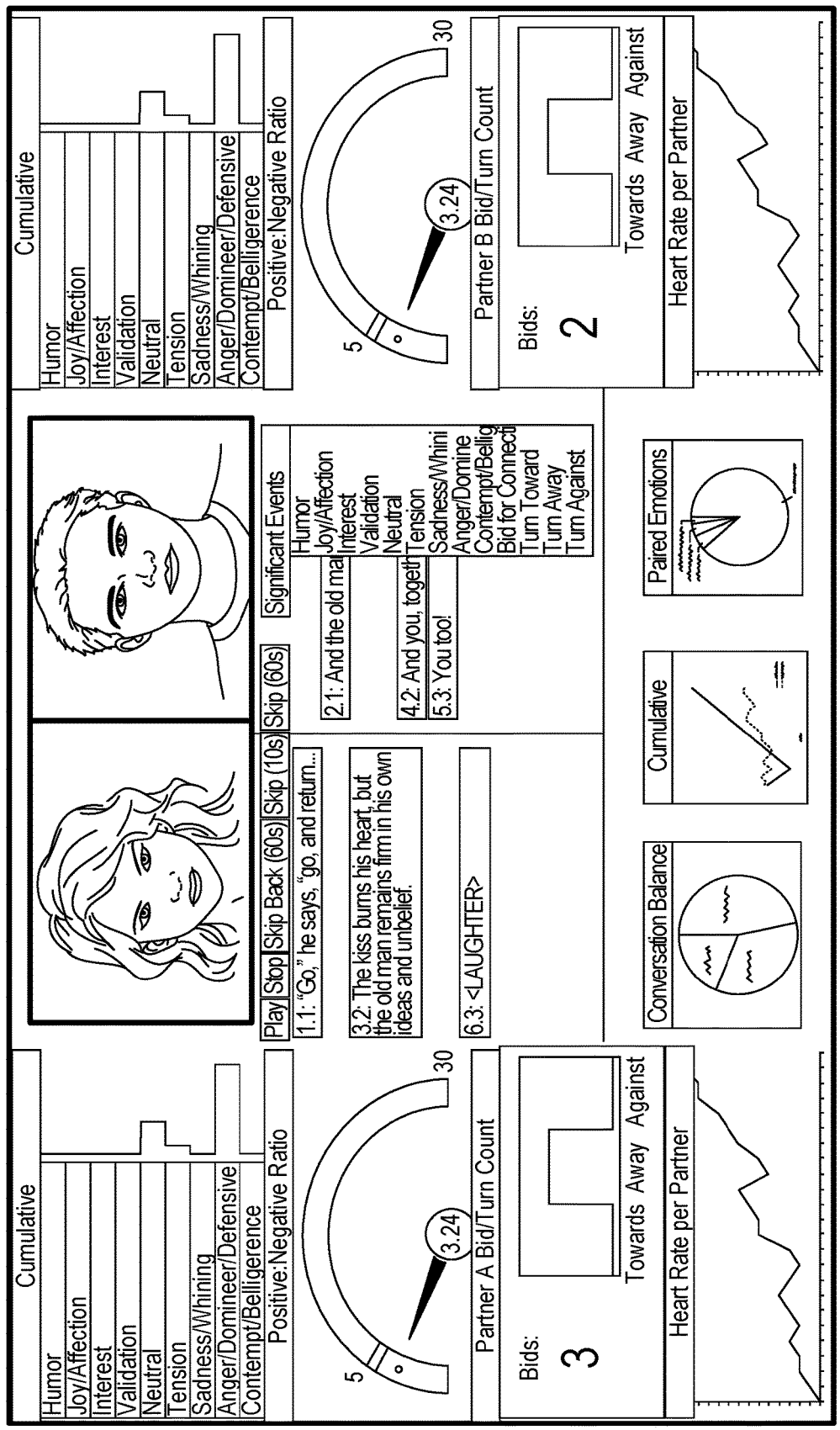
FIG. 21 shows an example displayed monitor.

As discussed above, certain implementations of the conversation-processing system 726 display a monitor (810 FIG. 8) that allows a human user to view the results of conversation processing. FIG. 21 shows an example displayed monitor. A user can step through a processed conversation to follow the textual representation of the conversation and view the affect codes associated with ULACs, along with various cumulative metrics and parameters.

The present invention has been described in terms of particular embodiments, it is not intended that the invention be limited to these embodiments. Modifications within the spirit of the invention will be apparent to those skilled in the art. For example, any of many different implementations of the above-disclosed system can be obtained by varying various design and implementation parameters, including modular organization, control structures, data structures, hardware, operating system, and virtualization layers, and other such design and implementation parameters. Variations with respect to the exact contents and organization of the affect-annotated-timeline data structure and affect-annotations records are possible. ACDPs can be represented by vectors or real numbers in the range [0,1] and in other manners. Different affect-coding systems can be used.

The invention claimed is:

1. An affect-annotated-timeline data structure stored in one of a data-storage device, a data-storage appliance, and an electronic memory within a computer system, the affect-annotated-timeline data structure generated from a monitored conversation by an automated affect-annotation system, the affect-annotated-timeline data structure comprising:
multiple affect-annotation records, each affect-annotation record
representing a conversation unit that
corresponds to a subinterval of the monitored conversation,
that is attributed to a particular source, and
that is generated, by the automated affect-annotation system, from one or more units of language for affect coding, referred to as "ULACs," each ULAC
corresponding to a minimal aggregation of words extracted from a conversation that conveys an intra-contextual meaning, and identified by the automated affect-annotation system based on lexical dependency graphs, and containing
a textual representation of the conversation unit,
an indication of a source of the conversation unit,
an indication of a temporal duration of the conversation unit and an indication of a temporal position of the conversation unit within the monitored conversation, and
an affect-code probability distribution.

2. The affect-annotated-timeline data structure of claim 1 wherein a source of a conversation unit is one of:
a human conversation participant; and
an automated-system conversation participant.

3. The affect-annotated-timeline data structure of claim 2 wherein the monitored conversation includes two or more sources.

4. The affect-annotated-timeline data structure of claim 1 wherein an indication of a temporal duration of the conversation unit and an indication of a temporal position of the conversation unit within the monitored conversation includes one of:
an indication of a start time and an indication of a time-interval length;
an indication of an end time and an indication of a time-interval length; and
an indication of a start time and an indication of an end time.

5. The affect-annotated-timeline data structure of claim 1 wherein an affect-code probability distribution is a discrete probability distribution that indicates the probability that the conversation unit represented by an affect-annotation record corresponds to each of multiple affect codes that each corresponds to an emotional state and/or intention that corresponds to one or more observables, the observables including behavioral patterns and physiological conditions.

6. The affect-annotated-timeline data structure of claim 5 wherein the affect codes are each represented by a numerical indication unique to the affect code.

7. The affect-annotated-timeline data structure of claim 6 wherein the affect codes include:
negative affect codes that include
contempt/belligerence,
domineering/defensive/anger,
sadness/whining, and
tension;
a neutral affect code; and
positive affect codes that include
validation,
interest,
joy/affection, and
humor.

8. The affect-annotated-timeline data structure of claim 1 wherein each affect-annotation record further includes a sequence number.

9. The affect-annotated-timeline data structure of claim 8 wherein each affect-annotation record further includes one or more additional numeric, text-containing, and alphanumeric fields.

10. An affect-annotation system that receives conversation data generated from a monitored conversation and processes the input conversation data to produce an electronic representation of the monitored conversation, the affect-annotation system comprising:
one or more processors;
one or more memories and mass-storage devices; and
computer instructions, stored in one or more of the one or more memories and mass-storage devices that, when executed by one or more of the one or more processors, control the affect-annotation system to
receive conversation data, including one or more of
video data,
audio data, and
physiological data,
generate multiple affect-annotation records for each of multiple conversation units identified using the received conversation data,
each conversation unit corresponding to a subinterval of the monitored conversation, attributed to a particular source, generated, by the automated affect-annotation system, from one or more units of language for affect coding, referred to as "ULACs," each ULAC corresponding to a minimal aggregation of words extracted from a conversation that conveys an intra-contextual meaning, and identified by the automated affect-annotation system based on lexical dependency graphs, and
each affect-annotation record containing a textual representation of a conversation unit, an indication of a source of the conversation unit, an indication of a temporal duration of the conversation unit, an indication of a temporal position of the conversation unit within the monitored conversation, and an affect-code probability distribution,
aggregate the generated affect-annotation records into an affect-annotated-timeline data structure, and
output the affect-annotated-timeline data structure to one or more of a display device, a data-storage appliance or device, and one or more downstream analysis systems.

11. The affect-annotation system of claim 10 wherein a source of a conversation unit is one of
a human conversation participant; and
an automated-system conversation participant; and
wherein the monitored conversation includes two or more sources.

12. The affect-annotation system of claim 10 wherein an indication of a temporal duration of the conversation unit and an indication of a temporal position of the conversation unit within the monitored conversation includes one of:
an indication of a start time and an indication of a time-interval length;
an indication of an end time and an indication of a time-interval length; and
an indication of a start time and an indication of an end time.

13. The affect-annotation system of claim 10 wherein an affect-code probability distribution is a discrete probability distribution that indicates the probability that the conversation unit represented by an affect-annotation record corresponds to each of multiple affect codes that each corresponds to an emotional state and/or intention that corresponds to one or more observables, the observables including behavioral patterns and physiological conditions.

14. The affect-annotation system of claim 10 wherein the affect codes are each represented by a numerical indication unique to the affect code.

15. The affect-annotation system of claim 14 wherein the affect codes include:
negative affect codes that include
contempt/belligerence,
domineering/defensive/anger, sadness/whining, and
tension;
a neutral affect code; and
positive affect codes that include
validation,
interest,
joy/affection, and
humor.

16. The affect-annotation system of claim 10 wherein each affect-annotation record further includes a sequence number.

\* \* \* \* \*